(12) United States Patent
Jeong et al.

(10) Patent No.: US 12,298,850 B2
(45) Date of Patent: May 13, 2025

(54) MEMORY SYSTEM INCLUDING MEMORY CONTROLLER AND MEMORY DEVICE AND METHOD FOR RECOVERING FROM AN ERROR THEREOF

(71) Applicant: Samsung Electronics Co., Ltd., Suwon-si (KR)

(72) Inventors: Jinhun Jeong, Suwon-si (KR); Sung-Joon Kim, Suwon-si (KR); Ilho Kim, Suwon-si (KR); Kyungjin Park, Suwon-si (KR); Changho Yun, Suwon-si (KR); Ho-Young Lee, Suwon-si (KR); Jongwon Jeong, Suwon-si (KR); Insu Choi, Suwon-si (KR); Kyung-Hee Han, Suwon-si (KR); Yunmi Hwang, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 163 days.

(21) Appl. No.: 18/328,959

(22) Filed: Jun. 5, 2023

(65) Prior Publication Data
US 2024/0168846 A1    May 23, 2024

(30) Foreign Application Priority Data

Nov. 22, 2022   (KR) .................. 10-2022-0157472

(51) Int. Cl.
*G06F 11/10* (2006.01)
*G06F 11/07* (2006.01)
*G06F 11/14* (2006.01)

(52) U.S. Cl.
CPC ........ *G06F 11/1068* (2013.01); *G06F 11/076* (2013.01); *G06F 11/1438* (2013.01)

(58) Field of Classification Search
CPC . G06F 11/1438; G06F 11/076; G06F 11/1068
See application file for complete search history.

(56) References Cited

U.S. PATENT DOCUMENTS

| | | | |
|---|---|---|---|
| 5,140,419 A * | 8/1992 | Galumbeck ............ | H04N 7/162 348/460 |
| 7,234,049 B2 * | 6/2007 | Choi ..................... | G06F 9/4401 713/1 |
| 7,288,975 B2 | 10/2007 | Ngo et al. | |
| 7,747,575 B2 | 6/2010 | Herberger et al. | |

(Continued)

*Primary Examiner* — Guy J Lamarre
(74) *Attorney, Agent, or Firm* — Harness, Dickey & Pierce, P.L.C.

(57) ABSTRACT

A method for preparing error recovery of a memory device included in a memory system includes performing a training operation of the memory device upon power-on of the memory system, booting an operating system into a normal mode by operating the memory device using a selected operation frequency of a plurality of operation frequencies based on results of the training operation, detecting an error frequency among the plurality of operation frequencies in response to a change of the selected operation frequency of the memory device by the operating system, the error frequency being an operation frequency which causes at least one error in the memory device, and storing information regarding the detected error frequency in a first register included in a memory controller associated with the memory device.

20 Claims, 12 Drawing Sheets

(56) References Cited

U.S. PATENT DOCUMENTS

| | | | |
|---|---|---|---|
| 7,882,223 B2 | 2/2011 | Brahmavar | |
| 8,132,057 B2 | 3/2012 | Jann et al. | |
| 8,331,519 B2 * | 12/2012 | Zhidkov | H03L 7/087 |
| | | | 375/357 |
| 8,750,871 B2 * | 6/2014 | Park | H04W 52/0245 |
| | | | 455/435.2 |
| 9,471,433 B2 | 10/2016 | Baker et al. | |
| 10,699,369 B2 | 6/2020 | Jasoliya | |
| 11,126,726 B2 | 9/2021 | Kobayashi | |
| 11,183,139 B2 * | 11/2021 | Kim | G09G 5/008 |
| 2003/0048716 A1 * | 3/2003 | Kim | G11B 7/126 |
| | | | 369/53.37 |
| 2004/0054771 A1 * | 3/2004 | Roe | H04N 7/17309 |
| | | | 709/224 |
| 2005/0246586 A1 * | 11/2005 | Chang | G06F 9/4403 |
| | | | 714/E11.154 |
| 2017/0185100 A1 * | 6/2017 | Nguyen | G06F 1/3206 |
| 2018/0253317 A1 * | 9/2018 | Pan | G06F 9/4416 |
| 2019/0215423 A1 * | 7/2019 | Ortiz | H04N 23/51 |
| 2019/0227894 A1 * | 7/2019 | Shih | G06F 11/2273 |
| 2020/0125463 A1 * | 4/2020 | Mestar | G06F 11/2048 |
| 2021/0103328 A1 * | 4/2021 | Oh | G11C 11/4076 |
| 2024/0111584 A1 * | 4/2024 | Yoo | G06Q 10/0631 |
| 2024/0160265 A1 * | 5/2024 | Abhishek | G06F 11/1417 |

* cited by examiner

MEMORY SYSTEM INCLUDING MEMORY CONTROLLER AND MEMORY DEVICE AND METHOD FOR RECOVERING FROM AN ERROR THEREOF

CROSS-REFERENCE TO RELATED APPLICATION

This U.S. non-provisional application claims the benefit of priority under 35 U.S.C. § 119 to Korean Patent Application No. 10-2022-0157472, filed on Nov. 22, 2022, in the Korean Intellectual Property Office, the disclosure of which is incorporated by reference herein in its entirety.

BACKGROUND

Various example embodiments of the inventive concepts relate to a memory system including memory controller and memory device and/or a method of operating the memory system, and more particularly, relate to an error recovery method and/or error recovery method of the memory system when an error related to an operation frequency of a memory device occurs.

Semiconductor memory devices may be generally classified into volatile semiconductor memory devices and non-volatile semiconductor memory devices. A volatile semiconductor memory device is generally fast in read and write speeds, but loses stored data when power is not supplied and/or interrupted to the memory device. In contrast, even though power is interrupted, information stored in the non-volatile semiconductor memory device is not lost (e.g., does not disappear). For this reason, the non-volatile semiconductor memory device is used to store information to be retained regardless of whether power is supplied to the memory device.

A representative example of the volatile memory is a dynamic random access memory (DRAM). A memory cell of the volatile memory device (e.g., a DRAM) may include one NMOS transistor serving as a switch and one capacitor storing electric charges (e.g., data). Binary data, e.g., "1" or "0", may correspond to the presence or absence of the electric charge stored in the capacitor in the DRAM memory cell, that is, whether a terminal voltage of the cell capacitor is high or low. The DRAM memory cell may be connected to a word line and a bit line. The bit line may be connected to a sense amplifier. The sense amplifier may sense data stored in the DRAM memory cell through the bit line based on a voltage applied to the word line.

A memory system may include a memory controller (e.g., a CPU, etc.) and a volatile memory (e.g., a DRAM memory device, etc.). The memory controller may select one of various operation frequencies to drive a volatile memory. Meanwhile, an operating system of the memory system may change various operation frequencies according to circumstances during a normal mode and use the volatile memory. However, the operating system of the memory system uses only one designated operation frequency while operating in a safe mode. When an error occurs in a volatile memory at one designated operation frequency, a problem in which an error in the memory system cannot be resolved even in the safe mode of the operating system may occur.

SUMMARY

Various example embodiments of the inventive concepts provide a memory system capable of recovering from an error of a memory device by driving and/or operating the memory device through one of the remaining operation frequencies except for the operation frequency in which the error occurs, and entering a safe mode of an operating system when the error occurs in at least one of the operation frequencies of the memory device while in a normal mode of the operating system.

According to at least one example embodiment of the inventive concepts, a method for preparing an error recovery operation of a memory device included in a memory system, includes performing a training operation of the memory device upon power-on of the memory system, booting an operating system into a normal mode by operating the memory device using a selected operation frequency of a plurality of operation frequencies based on results of the training operation, detecting an error frequency among the plurality of operation frequencies in response to a change of the selected operation frequency of the memory device by the operating system, the error frequency being an operation frequency which causes at least one error in the memory device, and storing information regarding the detected error frequency in a first register included in a memory controller associated with the memory device.

According to at least one example embodiment, the detecting of the error frequency further includes, operating the memory device at a selected operation frequency of the plurality of operation frequency, and determining the selected operation frequency is the error frequency in response to a failure to receive an expected response from the memory device associated with a transmitted memory command for the memory device for a specified time period.

According to at least one example embodiment, the detecting of the error frequency further includes, determining memory controller setting information stored in a mode selection register, and obtaining the selected operation frequency of the memory device based on the memory controller setting information.

According to at least one example embodiment, the method further includes, determining whether an expected response to a memory command has been received from the memory device within a first specified time period, determining that the memory device is in an error state based on results of the determining whether the expected response has been received, and entering a rebooting sequence in response to the memory device being in the error state for greater than a second specified time period.

According to at least one example embodiment of the inventive concepts, an error recovery method of a memory device included in a memory system, includes verifying error frequency information stored in a first register included in a memory controller associated with the memory device during a booting sequence or a rebooting sequence of the memory system, the error frequency information including information regarding an operation frequency which causes at least one error in the memory device, performing a training operation of the memory device based on the error frequency information, setting a selected operation frequency among a plurality of operation frequencies of the memory device, the setting the selected operation frequency including prohibiting selection of the error frequency from the plurality of operation frequencies as the selected operation frequency, and booting or rebooting an operating system into a safe mode by operating the memory device at the selected operation frequency.

According to at least one example embodiment, the performing of the training operation further includes, determining whether each of the operation frequencies of the plurality of operation frequencies is an error frequency, the error frequency causing at least one error in the memory device, and wherein the plurality of operation frequencies includes a first operation frequency of the memory device, a second operation frequency higher than the first operation frequency, a third operation frequency higher than the second operation frequency, and a fourth operation frequency higher than the third operation frequency.

According to at least one example embodiment, the setting of the selected operation frequency further includes, in response to one of the second to fourth operation frequencies being the error frequency, setting the first operation frequency as the selected operation frequency.

According to at least one example embodiment, the setting of the selected operation frequency, in response to one of the second to fourth operation frequencies being the error frequency, setting an operation frequency of the plurality of operation frequencies lower than the error frequency as the selected operation frequency.

According to at least one example embodiment, the setting of the selected operation frequency further includes, in response to the first operation frequency being the error frequency, setting one of the second to fourth operation frequencies as the selected operation frequency.

According to at least one example embodiment, the setting of the selected operation frequency further includes, in response to the first operation frequency being the error frequency, setting an operation frequency of the plurality of operation frequencies higher than the first operation frequency as the selected operation frequency.

According to at least one example embodiment of the inventive concepts, a memory system includes a memory device configured to be operated based on a plurality of operation frequencies, and a memory controller configured to detect an error frequency of the memory device among the plurality of operation frequencies while in a normal mode of an operating system, the error frequency being an operation frequency which causes at least one error in the memory device, store information on the error frequency in a first register upon detection of the error frequency, and operate the memory device by selecting an operation frequency from the plurality of operation frequencies other than the error frequency in response to the operating system being rebooted into a safe mode.

According to at least one example embodiment, the memory controller is further configured to, determine whether an expected response from the memory device has been received within a specified time period in response to a transmitted memory command while the memory device is operated at the selected operation frequency, and designate the selected operation frequency as the error frequency based on results of the determining.

According to at least one example embodiment, the memory controller is further configured to, obtain a current operation frequency of the memory device in response to an error occurring in the operation of the memory device, and designate the current operation frequency as the error frequency.

According to at least one example embodiment, the memory controller is further configured to, determine whether an expected response from the memory device has been received during a first specified time period following a transmitted command to the memory device while in a normal mode of an operating system, determine that the memory device is in an error state based on results of the determining the expected response, and execute the rebooting into the safe mode of the operating system in response to the error state exceeding a second specified time period.

According to at least one example embodiment, the memory controller is further configured to, in response to the rebooting into the safe mode of the operating system, verify the error frequency information stored in the first register.

According to at least one example embodiment, the memory controller is further configured to, in response to the rebooting into the safe mode of the operating system, identify whether the error frequency exists among a first operation frequency of the memory device, a second operation frequency higher than the first operation frequency, a third operation frequency higher than the second operation frequency, and a fourth operation frequency higher than the third operation frequency.

According to at least one example embodiment, the memory controller is further configured to, in response to one of the second to fourth operation frequencies being the error frequency, select the first operation frequency as the selected operation frequency of the memory device.

According to at least one example embodiment, the memory controller is further configured to, in response to one of the second to fourth operation frequencies being the error frequency, select an operation frequency lower than the error frequency as the selected operation frequency of the memory device.

According to at least one example embodiment, the memory controller is further configured to, in response to the first operation frequency being the error frequency, select one of the second to fourth operation frequencies as the selected operation frequency of the memory device.

According to at least one example embodiment, the memory controller is further configured to, in response to the first operation frequency being the error frequency, select an operation frequency higher than the first operation frequency as the selected operation frequency of the memory device.

BRIEF DESCRIPTION OF THE FIGURES

A detailed description of each drawing is provided to facilitate a more thorough understanding of the drawings referenced in the detailed description of various example embodiments of the inventive concepts.

DETAILED DESCRIPTION

Hereinafter, various example embodiments of the inventive concepts may be described in detail.

In addition, hereinafter, a DRAM may be used as an example of a semiconductor device for describing features and functions of one or more example embodiments of the inventive concepts. However, a person skilled in the art may easily appreciate other advantages and/or performance of one or more of the example embodiments of the inventive concepts depending on the content disclosed here. For example, one or more of the example embodiments of the inventive concepts may be implemented and/or applied to other example embodiments. In addition, one or more of the example embodiments may be changed and/or modified depending on view points and applications without departing from the claims, the scope and spirit, and any other purposes of the example embodiments of the inventive concepts.

Figure 1:
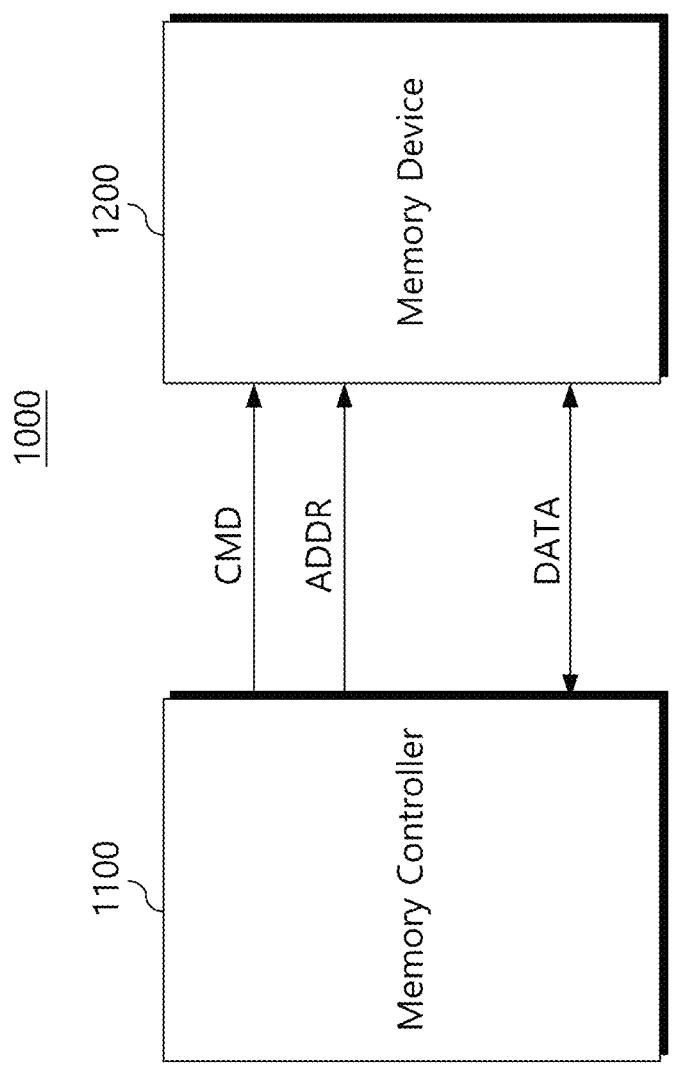
FIG. 1 is a block diagram illustrating a memory system, according to at least one example embodiment.

FIG. 1 is a block diagram illustrating a memory system, according to at least one example embodiment. Referring to FIG. 1, a memory system 1000 of at least one example embodiment of the inventive concepts may include a memory controller 1100 and/or a memory device 1200, etc., but the example embodiments are not limited thereto. Additionally, according to some example embodiments, the memory system 1000 may be implemented as a computer, a laptop, a server, a smartphone, a tablet, and/or other electronic device which includes a memory device, but is not limited thereto.

According to at least one example embodiment, the memory controller 1100 may perform at least one access operation for writing data to the memory device 1200 and/or reading data stored in the memory device 1200, but is not limited thereto. For example, the memory controller 1100 may generate a command CMD and an address ADDR for writing data to the memory device 1200 and/or reading data stored in the memory device 1200, etc. The memory controller 1100 may be at least one of a memory controller for controlling the memory device 1200, a bus controller, a system-on-chip (SoC) such as an application processor (AP), a central processing unit (CPU), a digital signal processor (DSP), and/or a graphics processing unit (GPU), etc., but is not limited thereto.

According to at least one example embodiment, the memory controller 1100 may control the overall operation of the memory device 1200 by providing various signals to the memory device 1200. For example, the memory controller 1100 may control a memory access operation of the memory device 1200 such as a read operation and/or a write operation, etc. The memory controller 1100 provides the command CMD and the address ADDR to the memory device 1200 to write data DATA to the memory device 1200 and/or to read data DATA from the memory device 1200, etc.

According to at least one example embodiment, the memory controller 1100 may generate various types of commands CMD to control the memory device 1200. For example, the memory controller 1100 may generate a bank request corresponding to a bank operation of changing states of a memory bank included in memory banks to read and/or write data DATA, etc. As an example, the bank request may include an active request for changing a state of the memory bank included in the memory banks to an active state. The memory device 1200 may activate a row included in the memory bank, that is, a word line, in response to the active request. The bank request may include a precharge request for changing the memory banks from an active state to a standby state after reading and/or writing of data DATA is completed. In addition, the memory controller 1100 may generate an I/O request (e.g., a CAS request, etc.) for performing a read operation and/or a write operation of data DATA in the memory device 1200. For example, the input/output request may include a read request for reading data DATA from activated memory banks. The input/output request may include a write request for writing data DATA to the activated memory banks. Also, the memory controller 1100 may generate a refresh command for controlling a refresh operation with respect to the memory banks. However, the types of commands CMD described herein are an example, and other types of memory access commands CMD may be generated, such as erase commands, etc.

According to at least one example embodiment, the memory device 1200 may output data DATA requested to be read by the memory controller 1100 to the memory controller 1100 and/or may store data DATA requested to be written by the memory controller 1100 in a memory cell. The memory device 1200 may input/output data DATA based on the command CMD and the address ADDR. The memory device 1200 may include a plurality of memory banks, but is not limited thereto.

In this case, the memory device 1200 may be a volatile memory device such as a dynamic random access memory (DRAM), a synchronous dynamic random access memory (SDRAM), a double data rate (DDR) DRAM, a DDR SDRAM, a low power double data rate (LPDDR) SDRAM, a graphics double data rate (GDDR) SDRAM, a rambus dynamic random access memory (RDRAM), and/or a static random access memory (SRAM), etc. Additionally or alternatively, the memory device 1200 may also be implemented in a non-volatile memory device such as a resistive RAM (RRAM), a phase change memory (PRAM), a magnetoresistive memory (MRAM), a ferroelectric memory (FRAM), a spin injection magnetization inversion memory (STT-RAM), etc. In at least one example embodiment, the advantages of the example embodiments of the inventive concepts are described using DRAM as an example for the sake of brevity and clarity, but the example embodiments of the inventive concepts are not limited thereto, and for example, one or more of the example embodiments may be adapted for use with other types of volatile memory and/or for use with various non-volatile memory types.

According to at least one example embodiment, memory banks may include at least one memory cell array divided in units of banks, a row decoder, a column decoder, a sense amplifier, and/or a write driver, etc., but is not limited thereto. The memory banks may store data DATA requested to be written in the memory device 1200 through the write driver, and may read data DATA requested to be read using the sense amplifier. In addition, a configuration for a refresh operation for storing and maintaining data in the cell array and/or selection circuits according to and/or based on an address may be further included.

Figure 2:
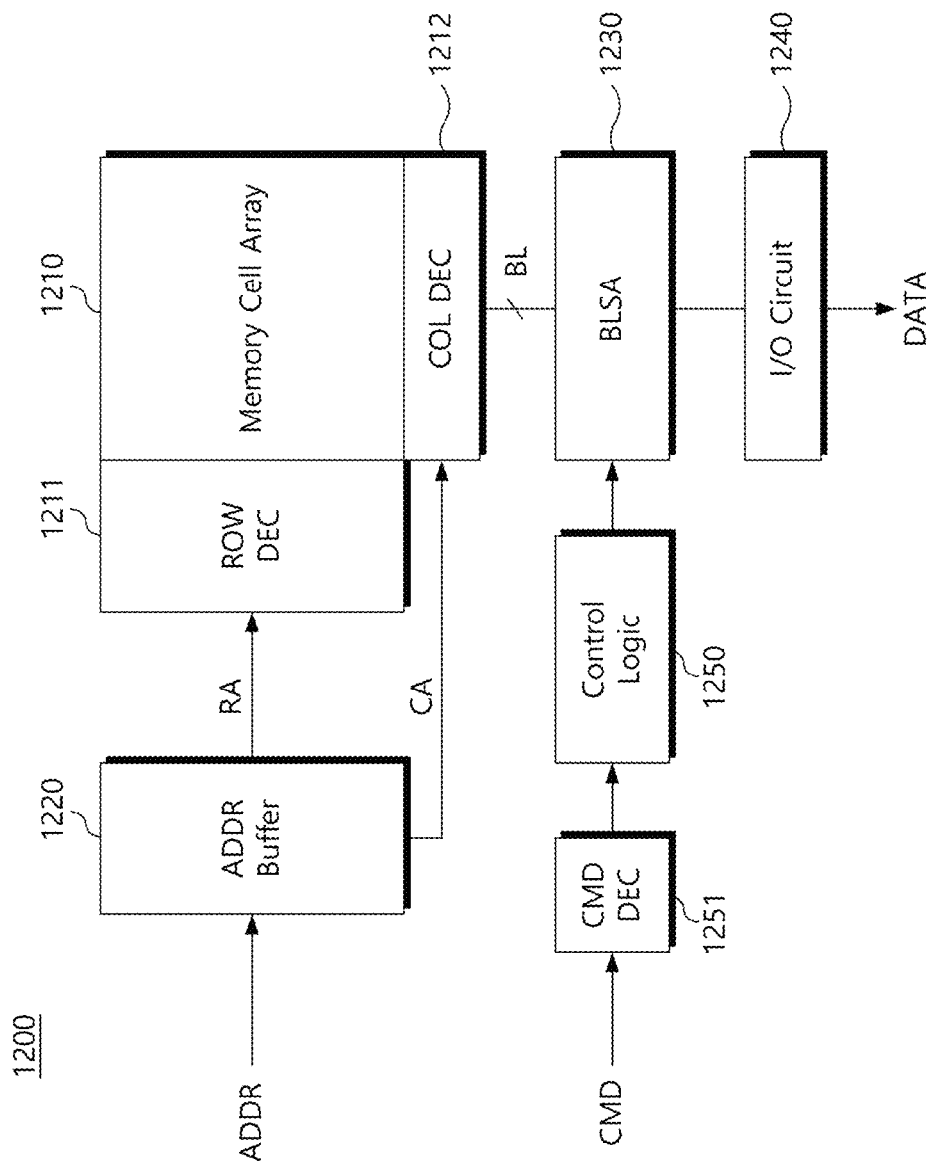
FIG. 2 is a block diagram illustrating a memory device of FIG. 1 according to at least one example embodiment.

FIG. 2 is a block diagram illustrating a memory device of FIG. 1 according to at least one example embodiments. Referring to FIG. 2, the memory device 1200 may include a memory cell array 1210, a row decoder 1211, a column decoder 1212, an address buffer 1220, a bit line sense amplifier 1230, an input/output circuit 1240, a command decoder 1251, and/or control logic 1250, etc., but is not limited thereto.

According to at least one example embodiment, the memory cell array 1210 may include a plurality of memory cells provided in a matrix form arranged in rows and columns. For example, the memory cell array 1210 may include a plurality of word lines and a plurality of bit lines BL connected to a plurality of memory cells. The plurality of word lines may be connected to a plurality of rows of memory cells, and the plurality of bit lines BL may be connected to a plurality of columns of memory cells.

According to at least one example embodiment, the address buffer 1220 may receive an address ADDR from the memory controller 1100 of FIG. 1. For example, the address ADDR may include a row address RA addressing a row of the memory cell array 1210 and a column address CA addressing a column of the memory cell array 1210. The address buffer 1220 may transmit the row address RA to the row decoder 1211 and may transmit the column address CA to the column decoder 1212.

According to at least one example embodiment, the row decoder 1211 may select any one of the plurality of word lines connected to the memory cell array 1210. The row decoder 1211 may decode the row address RA received from the address buffer 1220, may select one word line corresponding to the row address RA, and may activate the selected word line.

According to at least one example embodiment, the column decoder 1212 may select a specified bit line from among the plurality of bit lines BL of the memory cell array 1210. The column decoder 1212 may decode the column address CA received from the address buffer 1220 to select the specified bit line BL corresponding to the column address CA.

According to at least one example embodiment, the bit line sense amplifier 1230 may be connected to the bit lines BL of the memory cell array 1210. For example, the bit line sense amplifier 1230 may sense a voltage change of a selected bit line among the plurality of bit lines BL, and may amplify and output the voltage change. The input/output circuit 1240 may output data DATA output based on the sensed amplified voltage from the bit line sense amplifier 1230 to the memory controller 1100 through data lines.

According to at least one example embodiment, the command decoder 1251 may decode a write enable signal (/WE), a row address strobe signal (/RAS), a column address strobe signal (/CAS), and/or a chip select signal, etc., received from the memory controller 1100 such that control signals corresponding to and/or based on the command CMD are generated by the control logic 1250 (e.g., control logic circuitry, control logic device, etc.). The command CMD may include an active request, a read request, a write request, and/or a precharge request, etc., but is not limited thereto. The control logic 1250 may control the overall operation of the bit line sense amplifier 1230 through the control signals corresponding to the command CMD.

Figure 3:
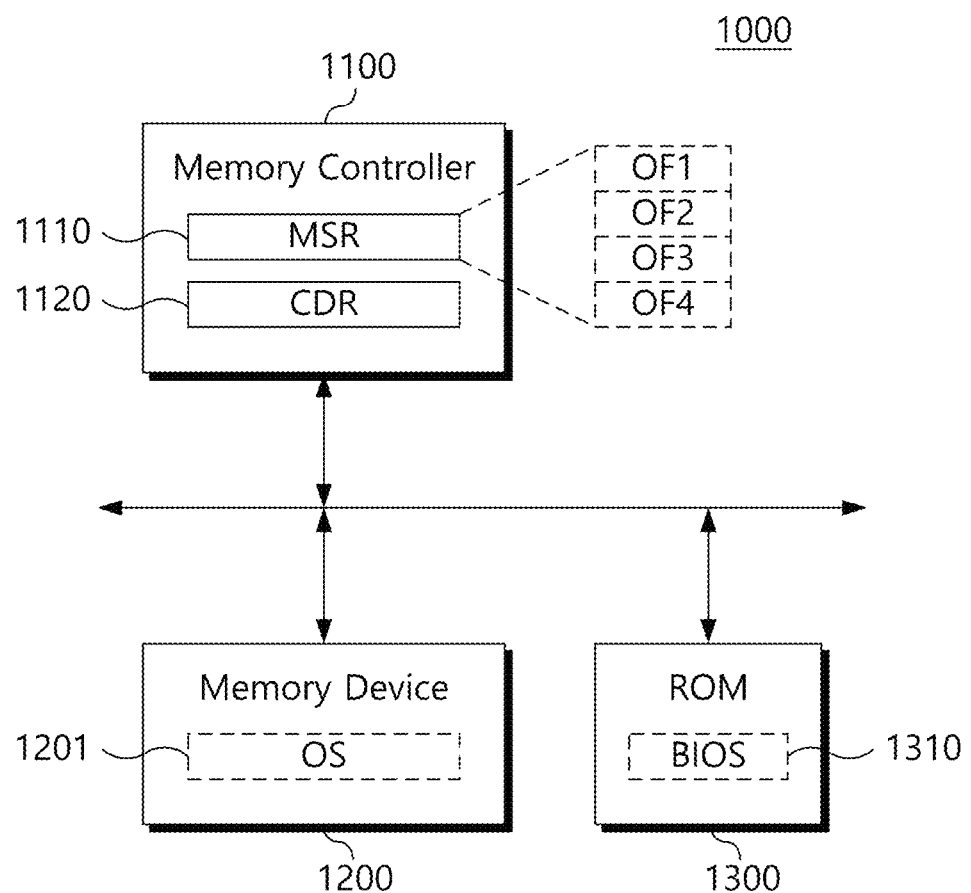
FIG. 3 is a diagram for describing an error recovery operation of a memory system of FIG. 1 according to at least one example embodiment.

FIG. 3 is a diagram for describing an error recovery operation of a memory system of FIG. 1 according to at least one example embodiments. Referring to FIG. 3, the memory system 1000 may include the memory controller 1100, the memory device 1200, and/or a read only memory (ROM) 1300, etc., but is not limited thereto, and for example, the memory system 1000 may include a greater or lesser number of constituent components. The memory controller 1100, the memory device 1200, and/or the ROM 1300 may exchange commands and/or data through at least one system bus. The memory controller 1100 may further include at least one register, such as a memory selection register 1110 and/or a crash dump register 1120, etc., but is not limited thereto, and for example, the memory selection register 1110 and the crash dump register 1120 may be combined into a single memory device, etc. The ROM 1300 may include a basic input output system (BIOS) 1310, etc. When the memory system 1000 boots, the BIOS 1310 initializes the memory controller 1100 and loads an operating system 1201 into the memory device 1200 to boot the memory system 1000, etc.

According to at least one example embodiment, the memory controller 1100 may perform at least one training operation with respect to an operation frequency (e.g., an operating frequency, etc.) of the memory device 1200. The training operation refers to at least one operation of searching for a frequency, latency and/or a signal level of at least one channel of the memory device 1200 to provide reliable operation, improved reliability, and/or optimal reliability. For example, when the memory system 1000 boots, the memory controller 1100 may be initialized through the BIOS 1310. The BIOS 1310 may allow the memory controller 1100 to perform at least one training operation of the memory device 1200. The memory controller 1100 may perform a check on all operation frequencies (e.g., operating frequencies, all frequencies at which the memory device is capable of operating, etc.) of the memory device 1200 to determine whether the memory device 1200 operates properly and/or operates normally at each of the operation frequencies, etc. According to at least one example embodiment, the memory device 1200 may operate at a plurality of operation frequencies. For example, the memory device 1200 may operate at a first operation frequency OF1 (e.g., 2000 Mbps), a second operation frequency OF2 (e.g., 3600 Mbps), a third operation frequency OF3 (e.g., 4400 Mbps), and/or a fourth operation frequency OF4 (e.g., 4800 Mbps), but the example embodiments are not limited thereto. The first operation frequency OF1 may be lower than the second operation frequency OF2. The second operation frequency OF2 may be lower than the third operation frequency OF3. The third operation frequency OF3 may be lower than the fourth operation frequency OF4. However, this is only an example, and the memory device 1200 may operate at one or more other operation frequencies, etc. The memory controller 1100 may store information on the possible operation frequencies of the memory device 1200 in the memory selection register 1110 and/or may store a current operation frequency of the memory device 1200 in the memory selection register 1110, etc.

According to at least one example embodiment, the memory controller 1100 may load and run the operating system 1201 on the memory device 1200. For example, the operating system 1201 may be stored in a nonvolatile memory included in the memory system 1000. When the memory system 1000 boots, the memory controller 1100 may load the operating system 1201 into the memory device 1200. The operating system 1201 may select one of the plurality of operation frequencies, e.g., the first operation frequency OF1, the second operation frequency OF2, the third operation frequency OF3, and/or the fourth operation frequency OF4, etc., at which to operate the memory device 1200. Additionally, the operating system 1201 may perform a frequency change operation of the memory device 1200 for more efficient power consumption (e.g., reduce the operation frequency of the memory device to reduce power consumption and/or improve battery life of a laptop computer, a mobile device, etc., and/or increase the operation frequency to improve and/or increase the performance of the memory device, etc.).

According to at least one example embodiment, when an input/output (I/O) failure due to at least one error occurring in the memory device 1200 occurs while operating in a normal mode of the operating system 1201, the memory system 1000 may indicate a "hang up" state in which a suspended state and/or non-responsive state of the operating system 1201 and/or memory system 1000 is maintained for a specific and/or desired period of time. For example, when there is no response from the memory device 1200 for a first specified time period (e.g., a first threshold period of time) at a selected specific and/or desired operation frequency, the memory controller 1100 may determine that the memory system 1000 is in the hang up state (e.g., a non-responsive state, etc.), or in other words, when the memory controller 1100 does not receive an expected response from the memory device 1200 after and/or in response to a transmitted memory command, the memory controller 1100 may determine that the memory device 1200 is in the hang up state and/or has committed an error, etc. When the hang up state lasts longer than a second specified time period (e.g., a second threshold period of time), the memory controller 1100 may perform a rebooting operation, but is not limited thereto. When rebooting of the memory system 1000 is repeated more than a specified and/or desired number of times (e.g., a threshold number of times), the operating system 1201 may enter a safe mode wherein a set and/or reduced number of device drivers (e.g., a minimum number of drivers, etc.) are loaded and/or executed by the operating system 1201. Additionally, the memory system 1000 may be rebooted by a user and the user and/or the operating system 1201 may cause the operating system 1201 to enter a safe mode. In the safe mode of the operating system 1201, the user may, for example, solve a problem of the memory system 1000 by determining the cause of the problem by using a diagnostic tool and/or by deleting a recently installed program, etc. Also, in the safe mode of the operating system 1201, the user may back up important files, etc. However, when the memory device 1200 is set to an operation frequency at which an error occurred (e.g., the error which caused the memory device 1200 to hang up), the hang up state of the memory system 1000 may repeatedly occur even while the operating system 1201 is in the safe mode.

According to at least one example embodiment, when a hang up state of the memory system 1000 occurs, the memory controller 1100 may store an error frequency of the memory device 1200 (e.g., store information indicating the operation frequency of the memory device 1200 which caused the hang up state and/or the operation frequency of the memory device 1200 prior to the entrance of the hang up state, etc.). For example, when an error of the memory device 1200 occurs while the operating system 1201 is in the normal mode, the memory controller 1100 may verify and/or determine the current operation frequency of the memory device 1200. The memory controller 1100 may verify and/or determine memory controller setting information (e.g., a memory controller BIOS request, memory controller BIOS data, etc.) stored in the mode selection register 1110. For example, the memory controller setting information may include, e.g., a memory controller PLL ratio, reference clock type information, gear type information, etc., but is not limited thereto. The memory controller 1100 may further include a memory reference code (MRC) function for obtaining a current operation frequency of the memory device 1200, etc. The memory controller 1100 may calculate the memory reference code function based on a memory controller setting information. The memory controller 1100 may verify and/or determine the current operation frequency of the memory device 1200 through the memory reference code function, but is not limited thereto. The memory controller 1100 may store the verified and/or determined current operation frequency as an error frequency of the memory device 1200 in the crash dump register 1120, but is not limited thereto.

According to at least one example embodiment, when booting or rebooting the memory system 1000, the memory controller 1100 may verify and/or determine the error frequency of the memory device 1200. For example, the memory controller 1100 may verify and/or determine the error frequency information stored in the crash dump register 1120 during booting or rebooting and may perform at least one training operation of the memory device 1200 based on the verified and/or determined error frequency. For example, the memory controller 1100 may operate the memory device 1200 at one of a plurality of operation frequencies other than the verified and/or determined error frequency, and the operating system 1201 may be booted or rebooted into a safe mode. Accordingly, in the safe mode of the operating system 1201, the memory controller 1100 may stably drive (e.g., operate, etc.) the memory device 1200 at an operation frequency at which error-free operation is verified, or in other words, the memory controller 1110 may operate the memory device 1200 at a frequency different from the memory operating frequency which caused and/or lead to the operating system 1201 being booted or rebooted into safe mode. The memory controller 1100 may decrease and/or solve a problem caused by an operation frequency error of the memory device 1200, and/or may increase and/or enable reliability in the memory device 1200, etc.

Figure 4:
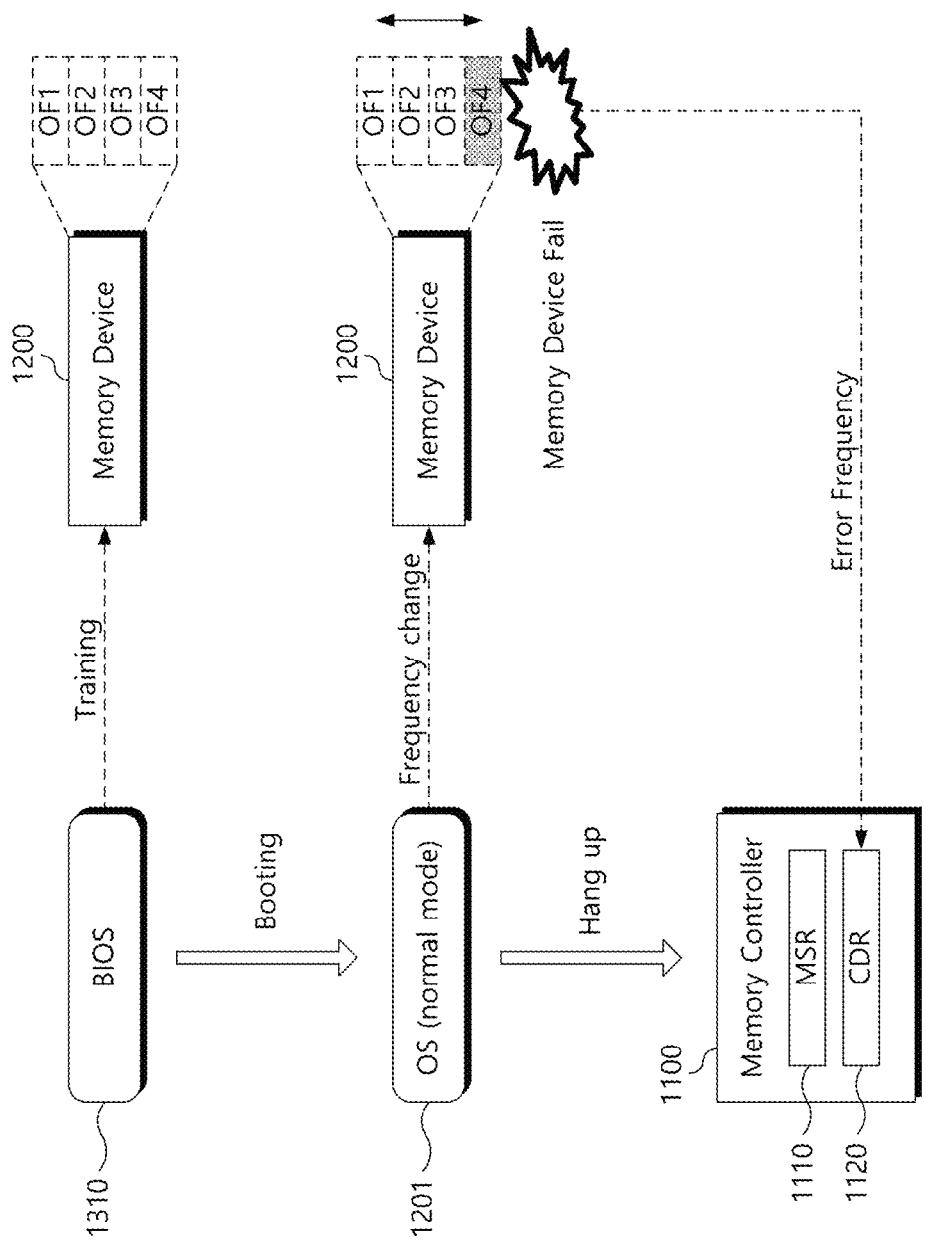
FIG. 4 is a diagram illustrating a method of preparing an error recovery of a memory device of FIG. 3 according to at least one example embodiment.

FIG. 4 is a diagram illustrating a method of preparing an error recovery of a memory device of FIG. 3 according to at least one example embodiments. Referring to FIGS. 3 and 4, the memory system 1000 may prepare a restoration of operation with respect to an operation error of the memory device 1200 due to a specific operation frequency of the memory device 1200, but is not limited thereto.

According to at least one example embodiment, when the memory system 1000 is powered on, the BIOS 1310 may perform at least one training operation of the memory device 1200. For example, the memory device 1200 may operate at a plurality of designated operation frequencies, etc., and the plurality of operation frequencies may include the first operation frequency OF1 (e.g., 2000 Mbps), the second operation frequency OF2 (e.g., 3600 Mbps), the third operation frequency OF3 (e.g., 4400 Mbps), and/or the fourth operation frequency OF4 (e.g., 4800 Mbps), etc. The first operation frequency OF1 may be lower than the second operation frequency OF2, but is not limited thereto. The second operation frequency OF2 may be lower than the third operation frequency OF3, but is not limited thereto. The third operation frequency OF3 may be lower than the fourth operation frequency OF4, but is not limited thereto. However, this is only an example, and the memory device 1200 may operate at one or more different operation frequencies, etc. The memory controller 1100 may determine whether the memory device 1200 operates normally (e.g., operates without errors, operates without entering a hang up state, etc.) with respect to each of a plurality of operation frequencies through the BIOS 1310. When the memory device 1200 operates normally at all of the plurality of operation frequencies, the memory controller 1100 may perform a booting operation of the operating system 1201 in a normal mode, etc.

According to at least one example embodiment, the operating system 1201 may perform an operation of changing the operation frequency of the memory device 1200 while operating in a normal mode. For example, the operating system 1201 may select an operation frequency of the memory device 1200 suitable and/or desirable for a current state while in the normal mode. For example, when a large amount of data needs to be moved and/or transferred between the memory controller 1100 and the memory device 1200 (e.g., during video playback, video chatting, large file installations, etc.), the operating system 1201 may select the highest operation frequency (e.g., the fourth operation OF4) to increase the performance of the memory device 1200 in comparison to the lower operation frequencies, etc. When only a small amount of data is to be moved between the memory controller 1100 and the memory device 1200 (e.g., running of a screen saver, a small number of applications being actively executed by the user, the operating system 1201 running in a sleep mode, etc.), the operating system 1201 may select the lowest operation frequency (e.g., the first operation frequency OF1) to reduce the energy consumption of the memory device 1200 in comparison to the higher operation frequencies, etc. As in the above description, the operating system 1201 may change the operation frequency of the memory device 1200 to suit a currently running application and/or operating environment, etc.

According to at least one example embodiment, when the operation frequency of the memory device 1200 is changed to a specific operation frequency of the memory device 1200, the memory system 1000 may fall into a hang up state. For example, the hang up state refers to a state in which the operation of the memory system 1000 is stopped for a specified period of time, etc. When there is no response from the memory device 1200 for a first specified time period, the memory controller 1100 may determine the memory device 1200 and/or the operating system 1201 is in the hang up state (e.g., an error state, etc.). The memory controller 1100 may lookup, verify and/or determine the memory controller setting information stored in the mode selection register 1110. The memory controller 1100 may include a memory reference code (MRC) function for obtaining a current operation frequency of the memory device 1200. The memory controller 1100 may calculate the memory reference code function based on memory controller setting information. The memory controller 1100 may verify the current operation frequency of the memory device 1200 through the memory reference code function. The memory controller 1100 may store the operation frequency verified in the hang up state into the crash dump register 1120 as an error frequency. For example, when the memory system 1000 falls into and/or is in the hang up state while the memory device 1200 operates at the fourth operation frequency OF4, the memory controller 1100 may store the fourth operation frequency OF4 in the crash dump register 1120 as an error frequency, etc.

According to at least one example embodiment, when the hangup state continues for the second specified time period (e.g., second desired time period, etc.), the memory system 1000 may be powered off or rebooted, or in other words, the memory system 1000 may automatically power off or reboot and/or enable the power off or reboot of the memory system 1000 after the amount of time that the memory system 1000 is in the hangup state exceeds the second desired time period. For example, the memory system 1000 may display a user interface message to a user instructing and/or indicating to the user to power off and/or reboot the memory system 1000 after the amount of time in the hangup state exceeds the second desired time period, etc. Additionally, when the hang up state continues for the second specified time period, the memory controller 1100 may perform an automatic power-off operation and/or reboot operation.

Figure 5:
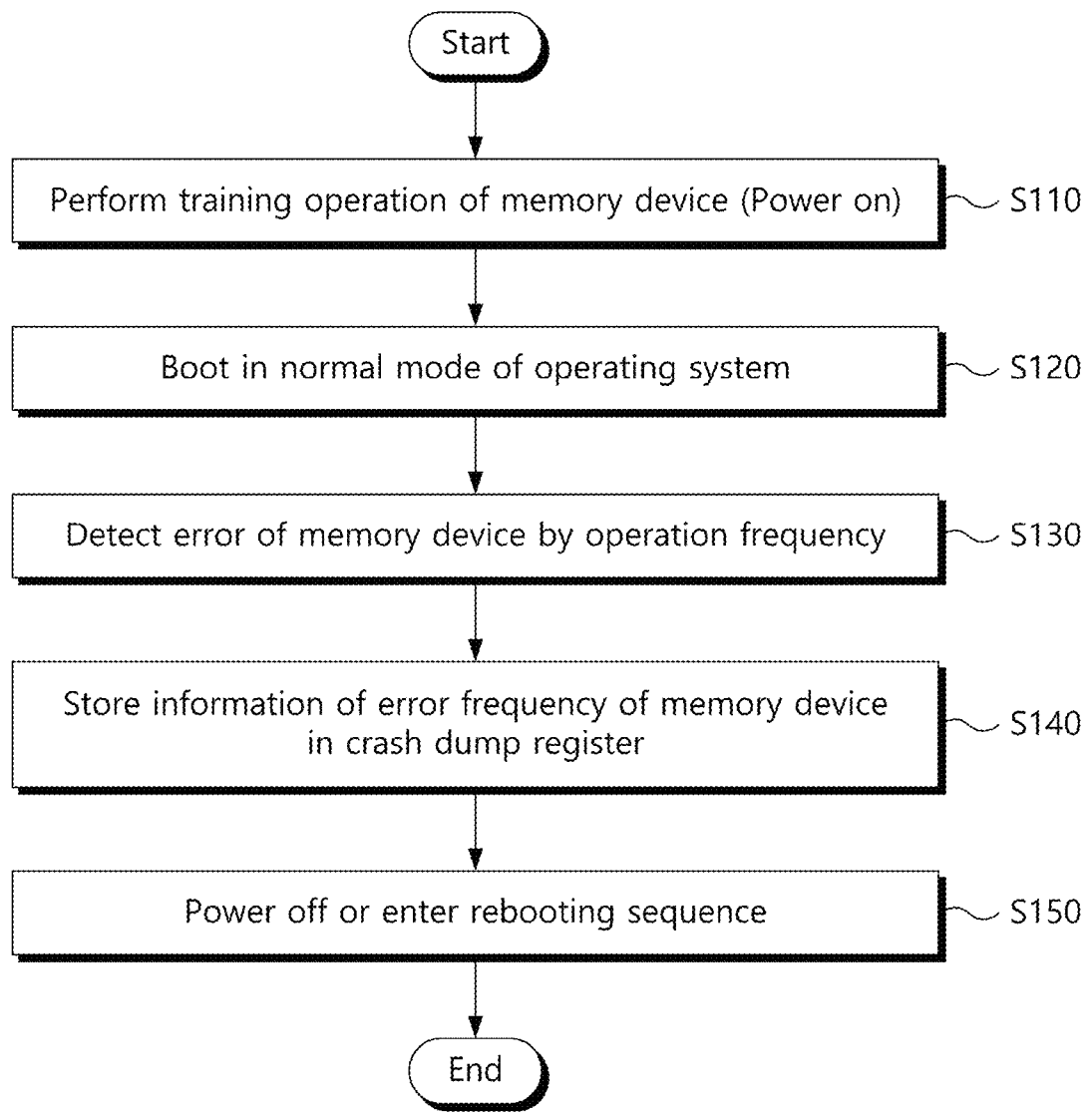
FIG. 5 is a flowchart illustrating a method of preparing an error recovery operation of a memory device of FIG. 6 according to at least one example embodiment.
Figure 6:
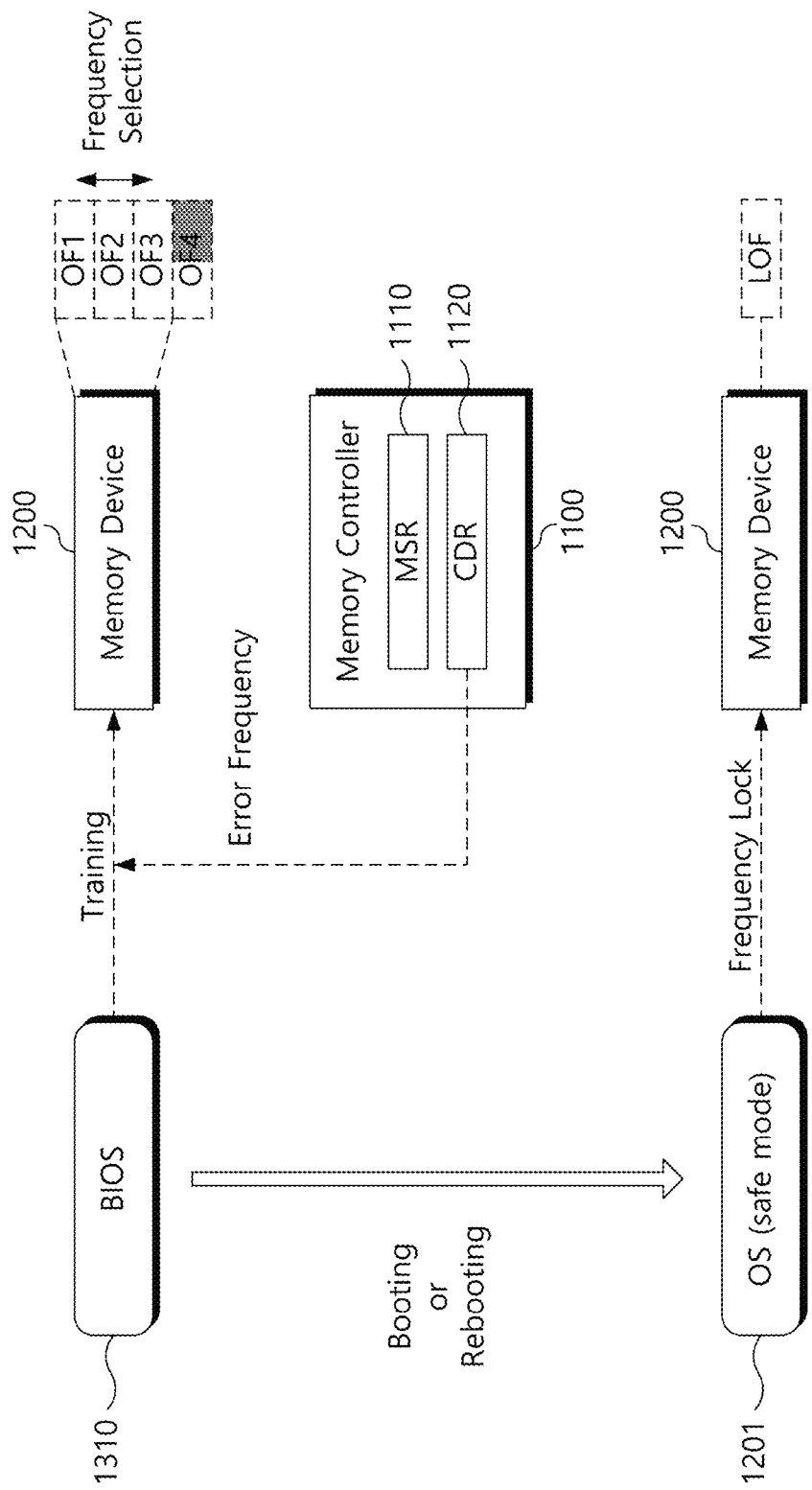
FIG. 6 is a diagram illustrating a method of recovering from an operation error of a memory system of FIG. 3 according to at least one example embodiment.

FIG. 5 is a flowchart illustrating a method of preparing an error recovery operation of a memory device of FIG. 6 according to at least one example embodiments. Referring to FIGS. 4 to 6, in case of an error in the memory system 1000 due to an error in the operation frequency of the memory device 1200, the memory controller 1100 may store error frequency information, but is not limited thereto.

According to at least one example embodiment, in operation S110, when the memory system 1000 is powered on, the memory controller 1100 may perform a training operation of the memory device 1200. For example, the memory controller 1100 may check whether the memory device 1200 operates normally (e.g., error free, etc.) at a plurality of operation frequencies set through the BIOS 1310. For example, the plurality of operation frequencies may include the first operation frequency OF1 (e.g., 2000 Mbps), the second operation frequency OF2 (e.g., 3600 Mbps), the third operation frequency OF3 (e.g., 4400 Mbps), and/or the fourth operation frequency OF4 (e.g., 4800 Mbps), but is not limited thereto. The first operation frequency OF1 may be lower than the second operation frequency OF2, but is not limited thereto. The second operation frequency OF2 may be lower than the third operation frequency OF3, but is not limited thereto. The third operation frequency OF3 may be lower than the fourth operation frequency OF4, but is not limited thereto. However, this is only an example, and the memory device 1200 may operate at one or more different operation frequencies, etc.

According to at least one example embodiment, in operation S120, the memory system 1000 may be booted in a normal mode of the operating system 1201 based on the results of the training operation, etc. For example, when the memory controller 1100 determines that the memory device 1200 operates normally at all of the plurality of operation frequencies, the memory controller 1100 may perform a booting operation of the operating system 1201 in a normal mode. Additionally, when the memory controller 1100 determines that the training operation of the memory device 1200 was not completed successfully and/or properly in operation S110, booting of the operating system 1201 into a normal mode by the memory controller 1100 may not be performed and/or omitted and/or the memory controller 1100 may boot the operating system 1201 into a safe mode, etc.

According to at least one example embodiment, in operation S130, the memory controller 1100 may detect at least one error in the operation of the memory device 1200 due to a set operation frequency of the memory device 1200, etc. For example, the operating system 1201 may select an operation frequency of the memory device 1200 suitable for a current state of the operating system 1201 and/or the memory system 1000 while in the normal mode. For example, when the operating system 1201 determines that a large amount of data is desired, is expected, and/or needs to be moved between the memory controller 1100 and the memory device 1200 (e.g., during a video playback operation, during the execution of a video chatting application, during a large file transfer, etc.), the operating system 1201 may select a higher operation frequency and/or the highest operation frequency of the memory device 1200 (e.g., the fourth operation frequency OF4) to improve the memory transfer speed and/or memory bandwidth of the memory device 1200, etc., but the example embodiments are not limited thereto. When the operating system 1201 determines that a small amount of data is desired, is expected, and/or needs to be moved between the memory controller 1100 and the memory device 1200 (e.g., during the execution of a screen saver, during a low power mode of the memory system 1000, during an idle period of the memory system 1000, etc.), the operating system 1201 may select a lower operation frequency and/or the lowest operation frequency of the memory device 1200 (e.g., the first operation frequency OF1) to improve the energy consumption of the memory device 1200, etc., but the example embodiments are not limited thereto. Consequently, the operating system 1201 may change the operation frequency of the memory device 1200 to suit at least one currently running application, a current status of the memory system 1000, a current operating environment of the memory system 1000, etc. However, when the operation frequency of the memory device 1200 is changed, the memory system 1000 may fall into the hang up state at the selected (e.g., changed, adjusted, etc.) specific operation frequency of the memory device 1200. The memory controller 1100 may determine that the memory device 1200 is in the hang up state (e.g., error state) when there is no response from the memory device 1200 in response to a transmitted memory command, etc., for a first specified time period at the selected specific operation frequency, etc. When the memory controller 1100 determines that the memory device 1200 is in the hang up state, the memory controller 1100 may designate a currently selected specific operation frequency as an error frequency, etc.

According to at least one example embodiment, when the memory system 1000 falls into the hang up state, the memory controller 1100 may detect and/or determine a current operation frequency of the memory device 1200 (e.g., the operation frequency of the memory device 1200 which caused the memory system 1000 to fall into the hang up state, etc.). As an example, the memory controller 1100 may verify the memory controller setting information stored in the mode selection register 1110, but is not limited thereto. The memory controller 1100 may include a memory reference code (MRC) function for obtaining a current operation frequency of the memory device 1200, but is not limited thereto. The memory controller 1100 may calculate the memory reference code function based on memory controller setting information, etc. The memory controller 1100 may verify the current operation frequency of the memory device 1200 through the memory reference code function, but is not limited thereto.

According to at least one example embodiment, in operation S140, the memory controller 1100 may store error frequency information of the memory device 1200 in the crash dump register 1120, but is not limited thereto. For example, when the memory system 1000 falls into the hang up state, the memory controller 1100 may store the current operation frequency of the memory device 1200 in the crash dump register 1120 as an error frequency. As another example, when the memory system 1000 falls into the hang up state while the memory device 1200 operates at the fourth operation frequency OF4, the memory controller 1100 may store the fourth operation frequency OF4 in the crash dump register 1120 as the error frequency, etc. The crash dump register 1120 may store at least one error frequency.

According to at least one example embodiment, in operation S150, when the hang up state continues for a specified time or longer, the memory controller 1100 may cause and/or enable the memory system 1000 to be powered off and/or enter a rebooting sequence. For example, the memory controller 1100 may display a user interface message to a user requesting the user to power off and/or reboot the memory system 1000, etc. Additionally, when the hang up state continues for the second specified time period, the memory controller 1100 may perform an automatic power-off operation and/or reboot operation, etc.

FIG. 6 is a diagram illustrating a method of recovery an operation error of a memory system of FIG. 3 according to at least one example embodiments. Referring to FIGS. 3 and 6, when at least one operation error occurs in the memory system 1000 of FIG. 4, the memory controller 1100 may enter the safe mode of the operating system 1201 after recovering from the operation error of the memory system 1000 by excluding an error frequency (e.g., locking the error frequency, disabling the error frequency, prohibiting the error frequency from being selected as a current operating frequency, etc.) from among a plurality of operation frequencies of the memory device 1200, but the example embodiments are not limited thereto.

According to at least one example embodiment, the memory controller 1100 may verify the stored error frequency through the error recovery preparation method of FIG. 4 in a booting sequence and/or a rebooting sequence, but the example embodiments are not limited thereto. For example, when an operation error of the memory system 1000 of FIG. 4 occurs and the hang up state continues for a specified time, the memory system 1000 may be automatically powered off and/or caused to be powered off by a user, etc. After that, the memory system 1000 may be powered on again by the user. Additionally, the memory system 1000 may automatically enter a reboot sequence when the hang up state continues for a specified period of time, etc. In this case, before the training operation of the memory device 1200 by the BIOS 1310 proceeds, the memory controller 1100 may verify the error frequency information stored in the crash dump register 1120. When error frequency information stored in the crash dump register 1120 exists, the memory controller 1100 may perform a recovery operation with respect to an operation error of the memory system 1000 of FIG. 6 (and/or FIG. 7, etc.), but the example embodiments are not limited thereto.

According to at least one example embodiment, the memory controller 1100 may perform a training operation of the memory device 1100 by reflecting, identifying, and/or determining the error frequency in a booting sequence and/or a rebooting sequence. For example, when the memory system 1000 is powered off and powered on by a user, the memory controller 1100 may perform the training operation of the memory device 1100 based on the error frequency. Additionally, when the memory system 1000 enters the rebooting sequence, the memory controller 1100 may perform the training operation of the memory device 1100 based on the error frequency. The memory controller 1100 may perform the training operation with respect to operation frequencies other than the error frequency among the plurality of operation frequencies. The memory controller 1100 may select at least one operation frequencies other than the error frequency. For example, when the fourth operation frequency OF4 is the error frequency, the memory controller 1100 (and/or the BIOS 1310) may lock the fourth operation frequency OF4 as the locked operation frequency (LOF), and may perform the training operation of the memory device 1200 with respect to the first to third operation frequencies OF1, OF2, and OF3, except for the fourth operation frequency OF4. The memory controller 1100 (and/or the BIOS 1310) may select one of the first to third operation frequencies OF1, OF2, and OF3 as a selected operation frequency, etc.

According to at least one example embodiment, the memory controller 1100 may boot and/or reboot the operating system 1201 in the safe mode based on the locked operation frequency (LOF). For example, in the safe mode of the operating system 1201, the memory controller 1100 may stably drive the memory device 1200 at one of the non-locked operation frequencies. Accordingly, the memory controller 1100 may improve and/or solve a problem caused by an operation frequency error of the memory device 1200 and may improve and/or secure reliability. While in the safe mode of the operating system 1201, the user may determine, investigate, and/or solve a problem of the memory system 1000 by, for example, identifying various causes of a problem using a diagnostic tool and/or by deleting a recently installed program, etc. Also, while in the safe mode of the operating system 1201, the user may back up important files and/or perform other backup operations, etc.

Figure 7:
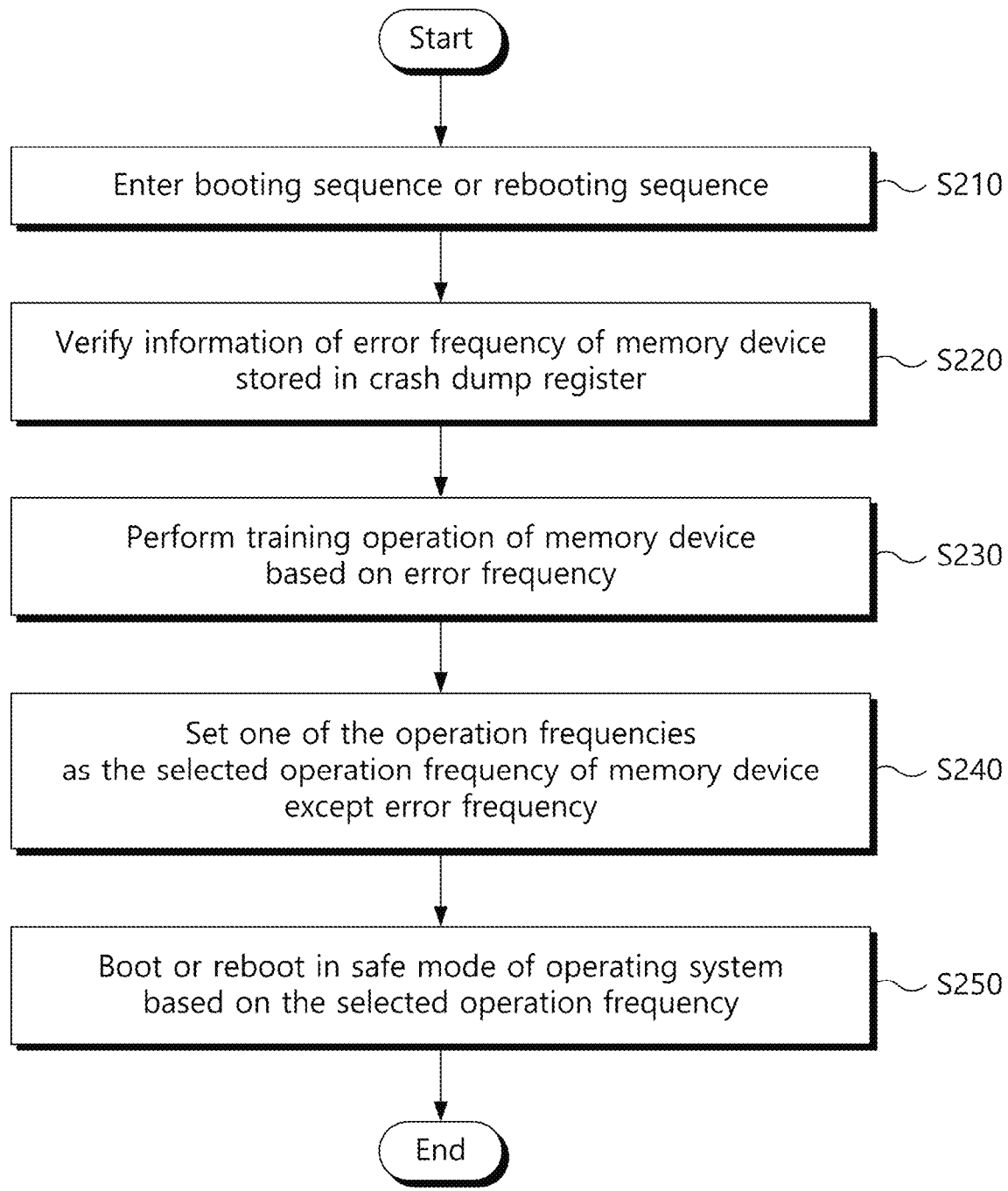
FIG. 7 is a flowchart illustrating a method of recovering from an operation error of a memory system of FIG. 6 according to at least one example embodiment.

FIG. 7 is a flowchart illustrating a method of recovery an operation error of a memory system of FIG. 6 according to at least one example embodiments. Referring to FIGS. 4, 6, and 7, the memory controller 1100 may recover from a frequency error of the memory device 1200 based on error frequency information.

According to at least one example embodiment, in operation S210, the memory system 1000 may enter a booting sequence or a rebooting sequence. For example, when the memory system 1000 is powered off in operation S150 of FIG. 5, the memory system 1000 may be powered on by a user and consequently may enter the booting sequence, but the example embodiments are not limited thereto. Additionally, the memory system 1000 may enter the rebooting sequence when the criteria specified in operation S150 of FIG. 5 are satisfied, but the example embodiments are not limited thereto. In this case, the memory controller 1100 may start the booting sequence or the rebooting sequence through the BIOS 1310, etc.

According to at least one example embodiment, in operation S220, the memory controller 1200 may verify error frequency information of the memory device 1200 stored in the crash dump register 1120, but is not limited thereto. For example, before the training operation of the memory device 1200 by the BIOS 1310 proceeds, the memory controller 1100 may verify the error frequency information stored in the crash dump register 1120. When error frequency information exists in the crash dump register 1120, the memory controller 1100 may perform operations after operation S230. When error frequency information does not exist in the crash dump register 1120, the memory controller 1100 may boot the operating system 1201 into the normal mode.

According to at least one example embodiment, in operation S230, the memory controller 1100 (and/or the BIOS 1310) may perform the training operation of the memory device 1200 based on the error frequency verified in operation S220. For example, the memory controller 1100 (and/or the BIOS 1310) may perform the training operation with respect to a plurality of operation frequencies other than the error frequency among the plurality of operation frequencies, but the example embodiments are not limited thereto. For example, when the fourth operation frequency OF4 is the error frequency, the memory controller 1100 (and/or the BIOS 1310) may perform the training operation of the memory device 1200 with respect to the first to third operation frequencies OF1, OF2, and OF3, except for the fourth operation frequency OF4, but the example embodiments are not limited thereto.

According to at least one example embodiment, in operation S240, the memory controller 1100 (and/or the BIOS 1310) may set and/or select an operation frequency selected from among operation frequencies of the memory device 1200 except for an error frequency which may be locked and/or prohibited from being selected by the memory controller 1100, the BIOS 1310, and/or the operating system 1201, etc. For example, the memory controller 1100 (and/or the BIOS 1310) may select one of operation frequencies other than the error frequency. The memory controller 1100 (and/or the BIOS 1310) may set the selected operation frequency to a non-locked operation frequency. For example, the memory controller 1100 (and/or the BIOS 1310) may select one of the first to third operation frequencies OF1, OF2, and OF3 as the non-locked operation frequency, etc.

According to at least one example embodiment, in operation S250, the memory controller 1100 may boot and/or reboot the operating system 1201 in the safe mode based on the non-locked operation frequency. For example, in the safe mode of the operating system 1201, the memory controller 1100 may stably drive the memory device 1200 at the non-locked operation frequency. Accordingly, the memory controller 1100 may improve and/or solve a problem caused by an operation frequency error of the memory device 1200 and may improve and/or secure reliability, etc. While in the safe mode of the operating system 1201, the user may investigate, determine, and/or solve a problem of the memory system 1000 by, for example, determining the cause of the problem by using a diagnostic tool and/or by deleting a recently installed program, etc. Also, in the safe mode of the operating system 1201, the user may back up important files and/or perform other backup-related operations, etc.

Figure 8:
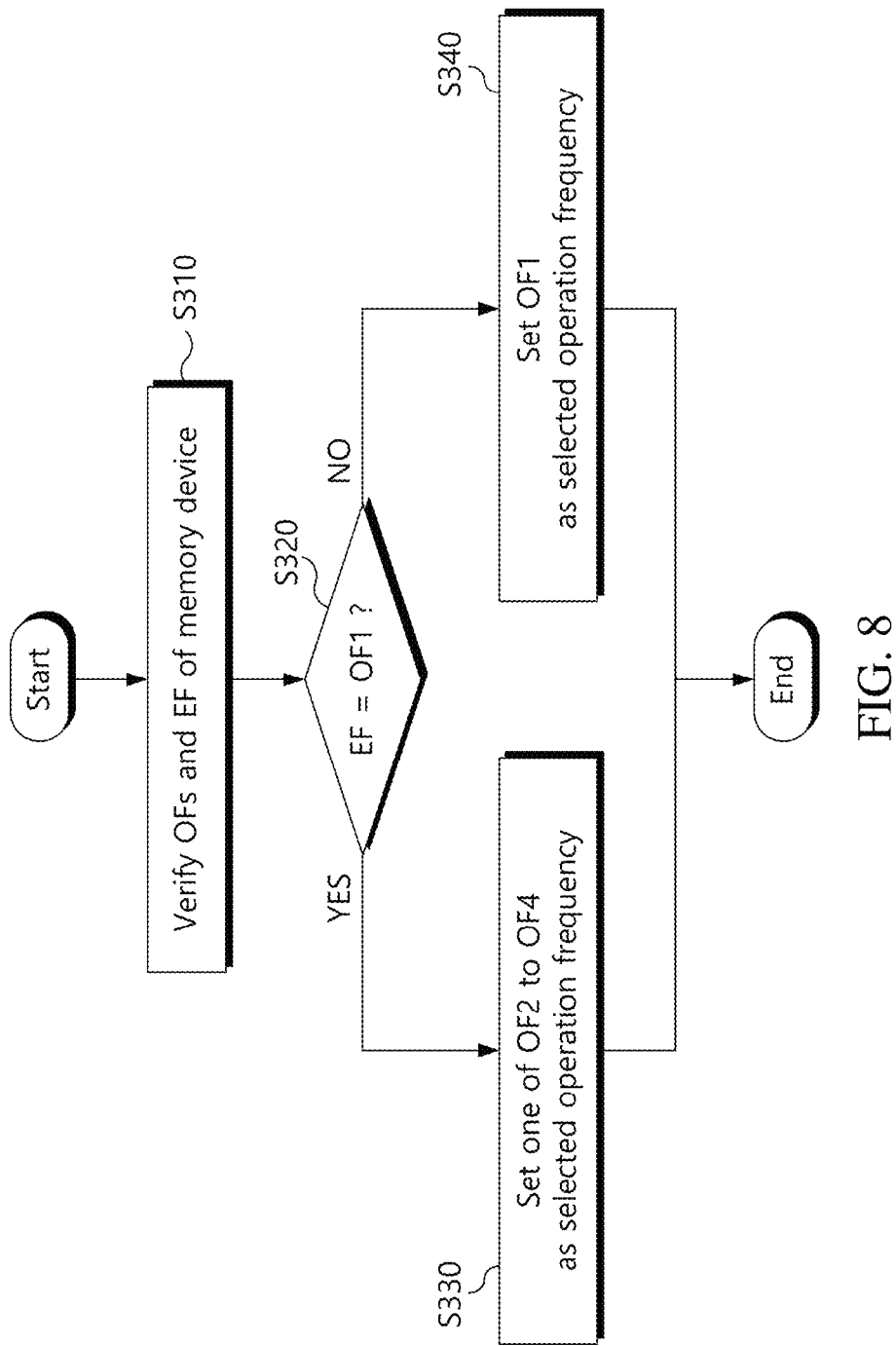
FIG. 8 is a flowchart illustrating an example of a method of locking a selected operation frequency of FIG. 7 according to at least one example embodiment.

FIG. 8 is a flowchart illustrating an example of a method of locking a selected operation frequency of FIG. 7 according to at least one example embodiments. Referring to FIG. 8, the memory controller 1100 may lock an operation frequency at which at least one error occurs before entering the safe mode of the operating system 1201, but is not limited thereto.

According to at least one example embodiment, in operation S310, the memory controller 1100 may verify operation frequencies and/or error frequencies of the memory device 1200, etc. For example, the memory controller 1100 may verify the error frequency information stored in the crash dump register 1120, etc. The memory controller 1100 may verify a plurality of operation frequencies (e.g., the first to fourth operation frequencies OF1, OF2, OF3, and OF4) through the training operation of the memory device 1200, but is not limited thereto. For example, the first operation frequency OF1 may be lower than the second operation frequency OF2. The second operation frequency OF2 may be lower than the third operation frequency OF3. The third operation frequency OF3 may be lower than the fourth operation frequency OF4.

According to at least one example embodiment, in operation S320, the memory controller 1100 may determine whether the error frequency is the lowest operation frequency (e.g., the first operation frequency OF1), but is not limited thereto. When the error frequency is the lowest operation frequency (e.g., the first operation frequency OF1), the memory controller 1100 may perform operation S330. When the error frequency is not the lowest operation frequency (e.g., the first operation frequency OF1), the memory controller 1100 may perform operation S340.

According to at least one example embodiment, when the error frequency is the lowest operation frequency (e.g., the first operation frequency OF1), in operation S330, the memory controller 1100 may lock the lowest operation frequency, and may set and/or select one of the remaining operation frequencies (e.g., the second to fourth operation frequencies OF2, OF3, and OF4) as the selected operation frequency.

According to at least one example embodiment, when the error frequency is not the lowest operation frequency (e.g., the first operation frequency OF1), in operation S340, the memory controller 1100 may set and/or select the lowest operation frequency (e.g., the first operation frequency OF1) as the selected operation frequency.

Figure 9:
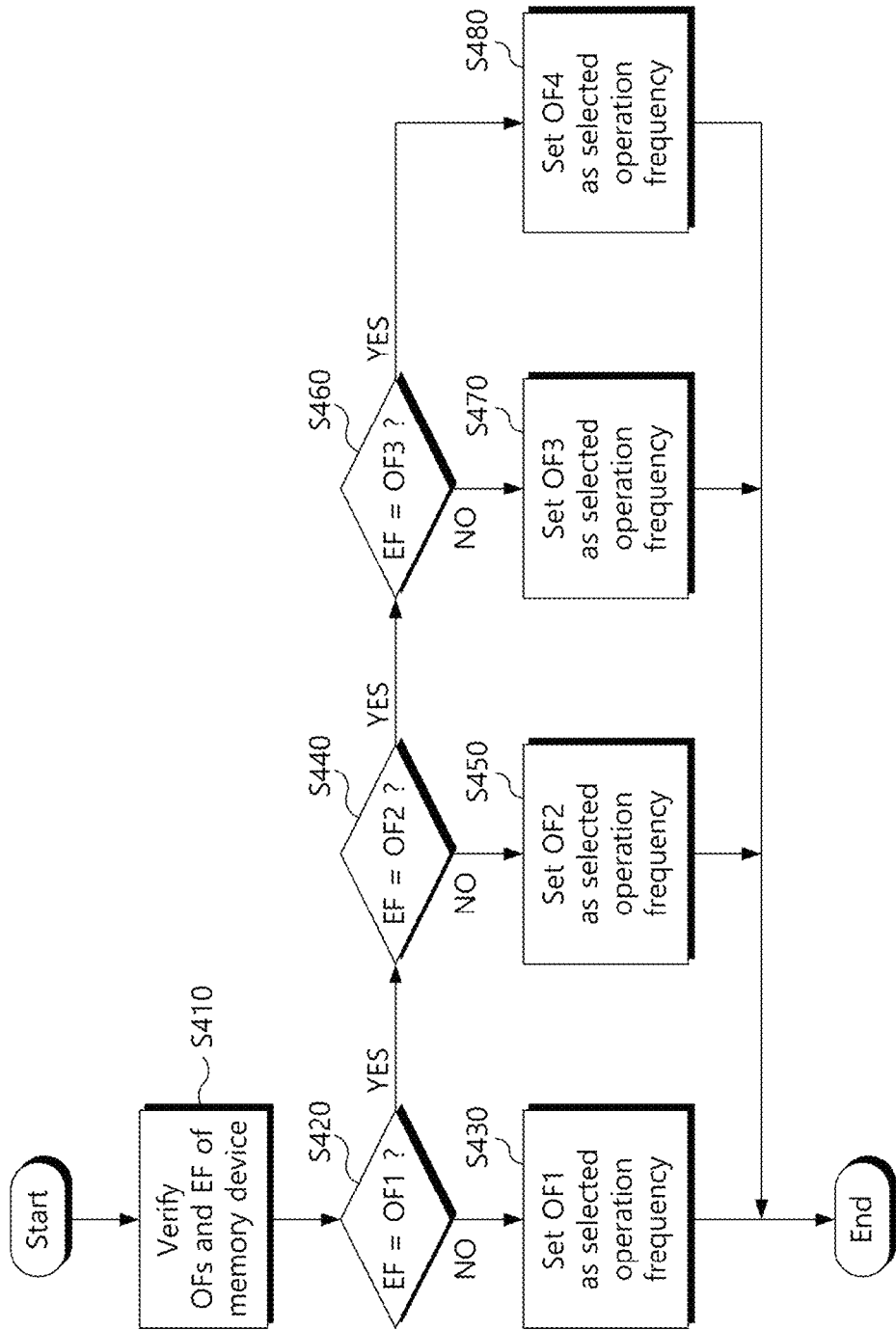
FIG. 9 is a flowchart illustrating another example of a method of locking a selected operation frequency of FIG. 7 according to at least one example embodiment.

FIG. 9 is a flowchart illustrating another example of a method of locking a selected operation frequency of FIG. 7 according to at least one example embodiments. Referring to FIG. 9, the memory controller 1100 may lock an operation frequency at which at least one error occurs before entering the safe mode of the operating system 1201, but the example embodiments are not limited thereto.

According to at least one example embodiment, in operation S410, the memory controller 1100 may verify operation frequencies and error frequencies of the memory device 1200. For example, the memory controller 1100 may verify the error frequency information stored in the crash dump register 1120, etc. The memory controller 1100 may verify operation frequencies (e.g., first to fourth operation frequencies OF1, OF2, OF3, and OF4) through a training operation of the memory device 1200, etc. For example, the first operation frequency OF1 may be lower than the second operation frequency OF2. The second operation frequency OF2 may be lower than the third operation frequency OF3. The third operation frequency OF3 may be lower than the fourth operation frequency OF4.

According to at least one example embodiment, in operation S420, the memory controller 1100 may determine whether the error frequency is the lowest operation frequency (e.g., the first operation frequency OF1). When the error frequency is not the lowest operation frequency (e.g., the first operation frequency OF1), the memory controller 1100 may perform operation S430. When the error frequency is the lowest operation frequency (e.g., the first operation frequency OF1), the memory controller 1100 may perform operation S440.

According to at least one example embodiment, when the error frequency is not the lowest operation frequency (e.g., the first operation frequency OF1), in operation S430, the memory controller 1100 may set and/or select the lowest operation frequency (e.g., the first operation frequency OF1) as the selected operation frequency, but is not limited thereto.

According to at least one example embodiment, when the error frequency is the lowest operation frequency (e.g., the first operation frequency OF1), in operation S440, the memory controller 1100 may lock (e.g., disable, lock out, etc.) the lowest operation frequency, and may determine whether the second operation frequency OF2, which is one step higher than the first operation frequency OF1, is also the error frequency. When the second operation frequency OF2 is not the error frequency, the memory controller 1100 may perform operation S450. When the second operation frequency OF2 is also the error frequency, the memory controller 1100 may perform operation S460.

According to at least one example embodiment, when the second operation frequency OF2 is not the error frequency, in operation S450, the memory controller 1100 may set and/or select the second operation frequency OF2 as the selected operation frequency.

According to at least one example embodiment, when the first operation frequency OF1 and the second operation frequency OF2 are error frequencies, in operation S460, the memory controller 1100 may lock the first operation frequency OF1 and the second operation frequency OF2, and may determine whether the third operation frequency OF3, which is one step higher than the second operation frequency OF2, is also an error frequency. When the third operation frequency OF3 is not the error frequency, the memory controller 1100 may perform operation S470. When the third operation frequency OF3 is also the error frequency, the memory controller 1100 may perform operation S480.

According to at least one example embodiment, when the third operation frequency OF3 is not the error frequency, in operation S470, the memory controller 1100 may set and/or select the third operation frequency OF3 as the selected operation frequency.

According to at least one example embodiment, when the first operation frequency OF1, the second operation frequency OF2, and the third operation frequency OF3 are error frequencies, in operation S480, the memory controller 1100 may lock the first operation frequency OF1, the second operation frequency OF2, and the third operation frequency OF3, and may set and/or select the fourth operation frequency OF4, which is one step higher than the third operation frequency OF3, as the selected operation frequency.

As described above, the memory controller 1100 may determine whether the error frequency exists in each step starting from the lowest operation frequency among the operation frequencies (e.g., the first to fourth operation frequencies OF1, OF2, OF3, and OF4), but the example embodiments are not limited thereto. Accordingly, the memory controller 1100 may improve stability and/or secure maximum stability by selecting the lowest operation frequency among error-free operation frequencies as the selected operation frequency.

Figure 10:
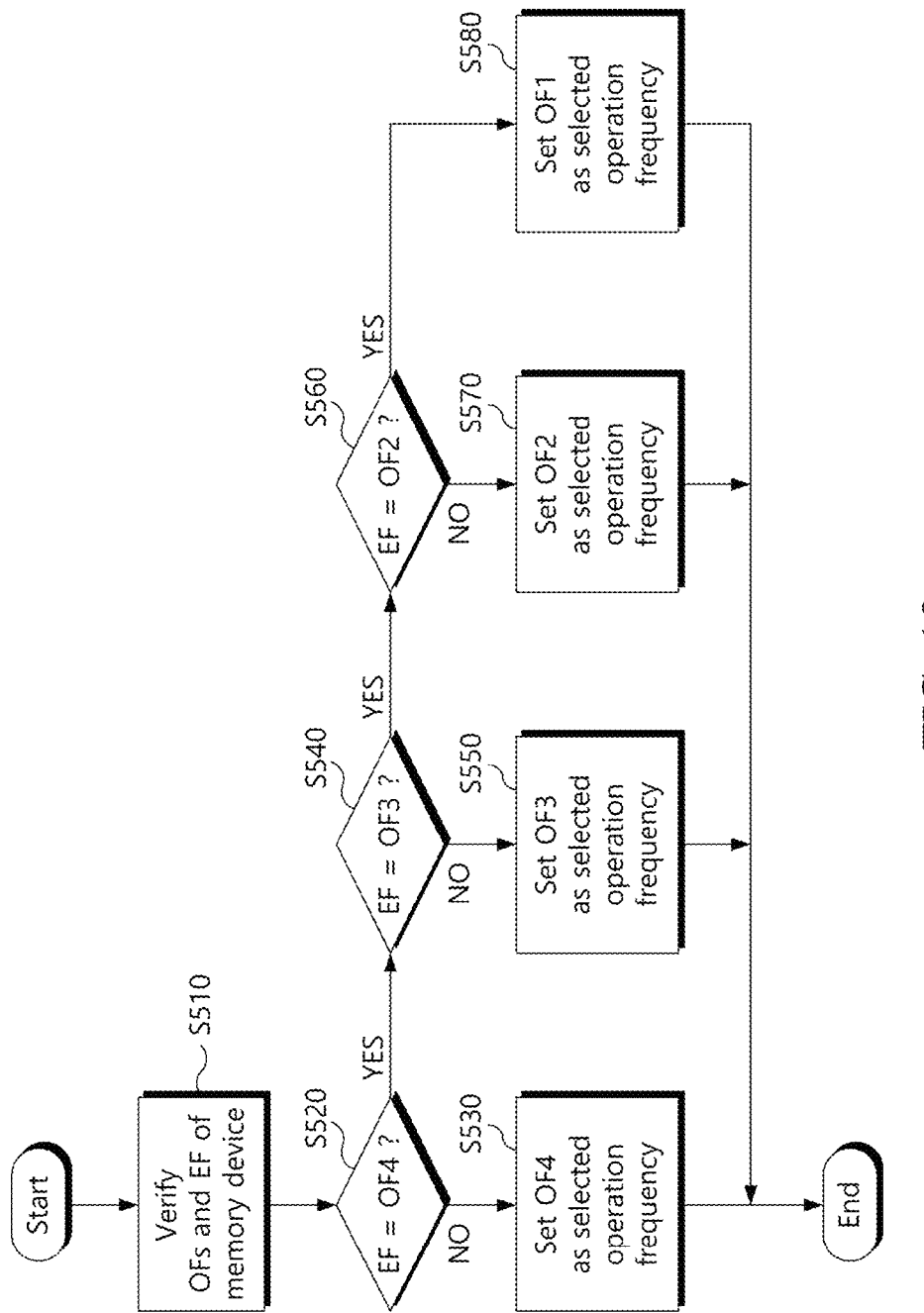
FIG. 10 is a flowchart illustrating still another example of a method of locking a selected operation frequency of FIG. 7 according to at least one example embodiment.

FIG. 10 is a flowchart illustrating still another example of a method of locking a selected operation frequency of FIG. 7 according to at least one example embodiments. Referring to FIG. 10, the memory controller 1100 may enter the safe mode of the operating system 1201 by locking an operation frequency at which at least one error occurs, but the example embodiments are not limited thereto.

According to at least one example embodiment, in operation S510, the memory controller 1100 may verify a plurality of operation frequencies and/or a plurality of error frequencies of the memory device 1200, but is not limited thereto. For example, the memory controller 1100 may verify the error frequency information stored in the crash dump register 1120, etc. The memory controller 1100 may verify a plurality of operation frequencies (e.g., first to fourth operation frequencies OF1, OF2, OF3, and OF4) through at least one training operation of the memory device 1200. For example, the first operation frequency OF1 may be lower than the second operation frequency OF2. The second operation frequency OF2 may be lower than the third operation frequency OF3. The third operation frequency OF3 may be lower than the fourth operation frequency OF4.

According to at least one example embodiment, in operation S520, the memory controller 1100 may determine whether the highest operation frequency (e.g., the fourth operation frequency OF4) is an error frequency. When the highest operation frequency (e.g., the fourth operation frequency OF4) is not the error frequency, the memory controller 1100 may perform operation S530. When the highest operation frequency (e.g., the fourth operation frequency OF4) is the error frequency, the memory controller 1100 may perform operation S540.

According to at least one example embodiment, when the highest operation frequency (e.g., the fourth operation frequency OF4) is not the error frequency, in operation S530, the memory controller 1100 may set and/or select the highest operation frequency (e.g., the fourth operation frequency OF4) as the selected operation frequency.

According to at least one example embodiment, when the highest operation frequency (e.g., the fourth operation frequency OF4) is an error frequency, in operation S540, the memory controller 1100 may lock the highest operation frequency and then may determine whether the third operation frequency OF3, which is one step lower than the fourth operation frequency OF4, is also an error frequency. When the third operation frequency OF3 is not the error frequency, the memory controller 1100 may perform operation S550. When the third operation frequency OF3 is also the error frequency, the memory controller 1100 may perform operation S560.

According to at least one example embodiment, when the third operation frequency OF3 is not an error frequency, in operation S550, the memory controller 1100 may set and/or select the third operation frequency OF3 as the selected operation frequency.

According to at least one example embodiment, when the fourth operation frequency OF4 and the third operation frequency OF3 are error frequencies, in operation S560, the memory controller 1100 may lock the fourth operation frequency OF4 and the third operation frequency OF3, and may determine whether the second operation frequency OF2, which is one step lower than the third operation frequency OF3, is also an error frequency. When the second operation frequency OF2 is not the error frequency, the memory controller 1100 may perform operation S570. When the second operation frequency OF2 is also the error frequency, the memory controller 1100 may perform operation S580.

According to at least one example embodiment, when the second operation frequency OF2 is not the error frequency, in operation S570, the memory controller 1100 may set and/or select the second operation frequency OF2 as the selected operation frequency. According to at least one example embodiment, when the fourth operation frequency OF4, the third operation frequency OF3, and the second operation frequency OF2 are error frequencies, in operation S580, the memory controller 1100 may lock the fourth operation frequency OF4, the third operation frequency OF3, and the second operation frequency OF2, and may set and/or select the first operation frequency OF1, which is one step lower than the second operation frequency OF2, as the selected operation frequency.

As described above, the memory controller 1100 may determine whether the error frequency exists in each step starting from the highest operation frequency among the operation frequencies (e.g., the first to fourth operation frequencies OF1, OF2, OF3, and OF4, etc.). Accordingly, the memory controller 1100 may improve and/or secure stability and operating speed in a balanced manner by setting the highest frequency among error-free operation frequencies as the selected operation frequency and locking (e.g., disabling) error frequencies from being selected as the current operating frequency, etc.

Figure 11:
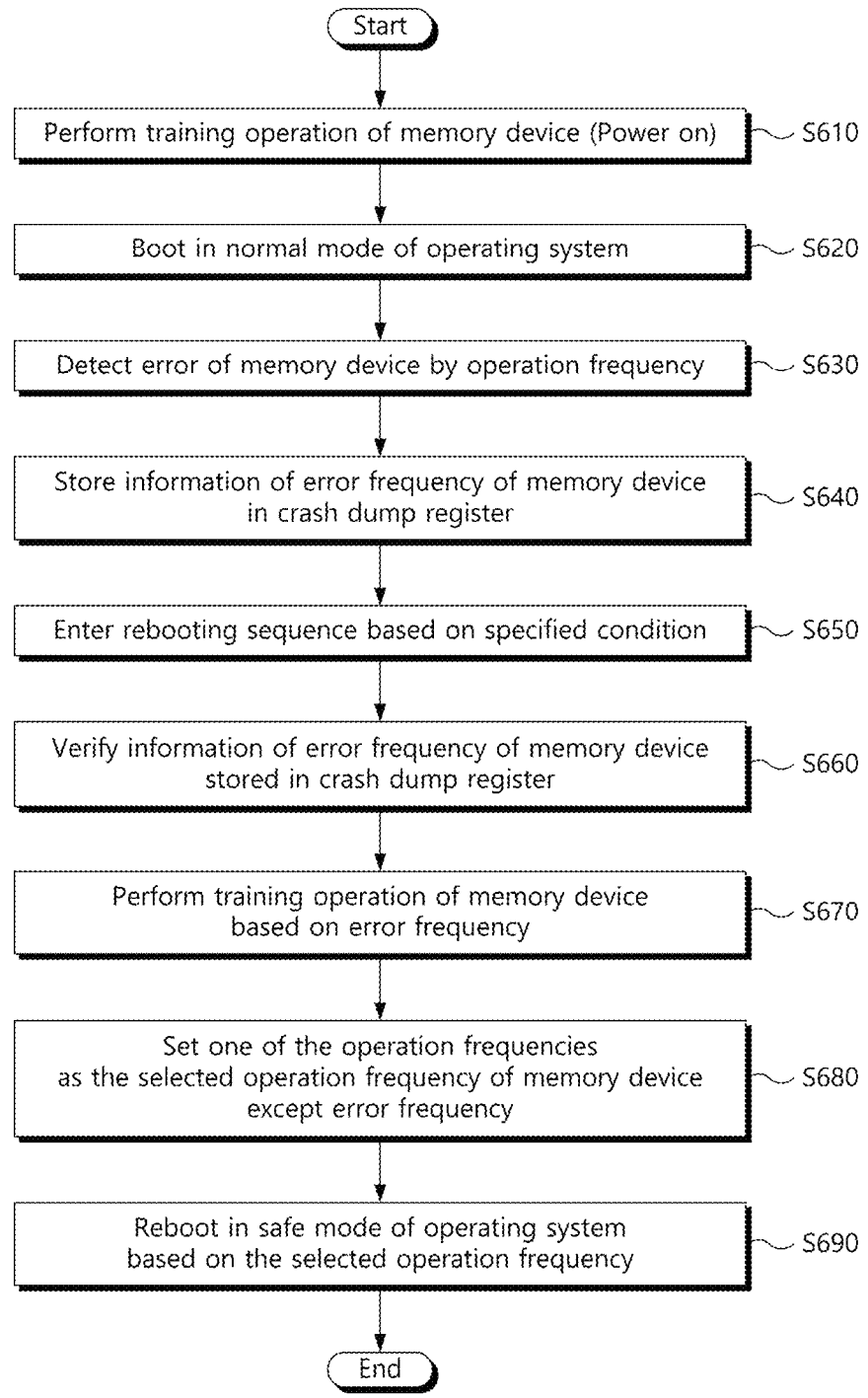
FIG. 11 is a flowchart illustrating another example of an error recovery method of a memory device of FIG. 3 according to at least one example embodiment.

FIG. 11 is a flowchart illustrating another example of an error recovery method of a memory device of FIG. 3 according to at least one example embodiments. Referring to FIGS. 3 and 11, when an error occurs in the memory system 1000 due to the current operation frequency of the memory device 1200 while in the normal mode of the operating system 1201, the memory controller 1100 may verify the error frequency and may drive the memory device 1200 at an error-free operation frequency in the safe mode of the operating system 1201, but the example embodiments are not limited thereto.

According to at least one example embodiment, in operation S610, when the memory system 1000 is powered on, the memory controller 1100 may perform a training operation of the memory device 1200, etc. For example, the memory controller 1100 may determine whether the memory device 1200 operates normally (e.g., operates correctly, operates error-free, etc.) at a plurality of operation frequencies through the BIOS 1310. For example, the plurality of operation frequencies may include the first operation frequency OF1 (e.g., 2000 Mbps), the second operation frequency OF2 (e.g., 3600 Mbps), the third operation frequency OF3 (e.g., 4400 Mbps), and/or the fourth operation frequency OF4 (e.g., 4800 Mbps), but the example embodiments are not limited thereto. The first operation frequency OF1 may be lower than the second operation frequency OF2. The second operation frequency OF2 may be lower than the third operation frequency OF3. The third operation frequency OF3 may be lower than the fourth operation frequency OF4. However, this is only an example, and the memory device 1200 may operate at one or more different operation frequencies.

According to at least one example embodiment, in operation S620, the memory system 1000 may be booted into a normal mode of the operating system 1201. More specifically, in operation S620, in response to the memory controller 1100 determining that the memory device 1200 operates normally at all of the plurality of operation frequencies, the memory controller 1100 may perform a booting operation of the operating system 1201 into a normal mode. For example, when the training operation of the memory device 1200 is not completed successfully in operation S610, the memory controller 1100 may not perform a booting of the operating system 1201 and/or may boot the operating system 1201 into a safe mode, but the example embodiments are not limited thereto.

According to at least one example embodiment, in operation S630, the memory controller 1100 may detect at least one error of the memory device 1200 due to a current operation frequency of the memory device 1200, etc. For example, the operating system 1201 may select an operation frequency of the memory device 1200 suitable for a current state of the operating system 1201 while in the normal mode and therefore may change the operation frequency of the memory device 1200 to suit the current state of the operating system 1201 (e.g., to suit a currently running application, etc.), but is not limited thereto. When the operation frequency of the memory device 1200 is changed by the operating system 1201, the memory system 1000 may fall into the hang up state (and/or non-responsive state) at the changed operation frequency (e.g., the specific operation frequency selected by the operating system 1201) of the memory device 1200, etc., but is not limited thereto. The memory controller 1100 may determine that the memory device 1200 is in the hang up state when there is no response from the memory device 1200 for a first specified time period at the selected specific operation frequency. When the memory controller 1100 determines that the memory device 1200 is in the hang up state, the memory controller 1100 may designate and/or determine that a currently selected specific operation frequency is an error frequency, etc.

According to at least one example embodiment, when the memory system 1000 falls into the hang up state, the memory controller 1100 may detect and/or determine the current operation frequency of the memory device 1200. As an example, the memory controller 1100 may verify and/or determine the memory controller setting information stored in the mode selection register 1110, etc. More specifically, the memory controller 1100 may include a memory reference code (MRC) function for obtaining a current operation frequency of the memory device 1200. The memory controller 1100 may calculate the memory reference code function based on memory controller setting information. The memory controller 1100 may verify and/or determine the current operation frequency of the memory device 1200 through the memory reference code function.

According to at least one example embodiment, in operation S640, the memory controller 1100 may store error frequency information of the memory device 1200 in the crash dump register 1120, but is not limited thereto. For example, when the memory system 1000 falls into the hang up state, the memory controller 1100 may store the current operation frequency of the memory device 1200 in the crash dump register 1120 as an error frequency. The crash dump register 1120 may store at least one error frequency.

According to at least one example embodiment, in operation S650, the memory system 1000 may enter the rebooting sequence based on a specified condition. For example, the specified condition may be when the hangup state continues for the second specified time period, and accordingly, the memory controller 1100 may enter the rebooting sequence.

According to at least one example embodiment, in operation S660, the memory controller 1200 may verify error frequency information of the memory device 1200 stored in the crash dump register 1120, etc. For example, before the training operation of the memory device 1200 by the BIOS 1310 proceeds, the memory controller 1100 may verify the error frequency stored in the crash dump register 1120.

According to at least one example embodiment, in operation S670, the memory controller 1100 (and/or the BIOS 1310) may perform the training operation of the memory device 1200 based on the verified error frequency. For example, the memory controller 1100 (and/or the BIOS 1310) may perform the training operation with respect to operation frequencies other than the error frequency among the plurality of operation frequencies.

According to at least one example embodiment, in operation S680, the memory controller 1100 (and/or the BIOS 1310) may select and/or set the operation frequency selected from among the plurality of operation frequencies of the memory device 1200, except for an error frequency (which may be locked). For example, the memory controller 1100 (and/or the BIOS 1310) may select one of operation frequencies other than the error frequency. The memory controller 1100 (and/or the BIOS 1310) may set the selected operation frequency to any of the other operation frequencies except for the locked operation frequency (LOF).

According to at least one example embodiment, in operation S690, the memory controller 1100 may reboot the operating system 1201 into the safe mode based on the LOF. For example, while in the safe mode of the operating system 1201, the memory controller 1100 may stably drive the memory device 1200 at a non-locked operation frequency. Accordingly, the memory controller 1100 may improve and/or solve a problem caused by an operation frequency error of the memory device 1200 and may improve and/or secure reliability of a memory device. In the safe mode of the operating system 1201, the user may determine and/or solve a problem of the memory system 1000 by determining the cause of the problem by using a diagnostic tool or by deleting a recently installed program, etc. Also, in the safe mode of the operating system 1201, the user may back up important files, etc.

Figure 12:
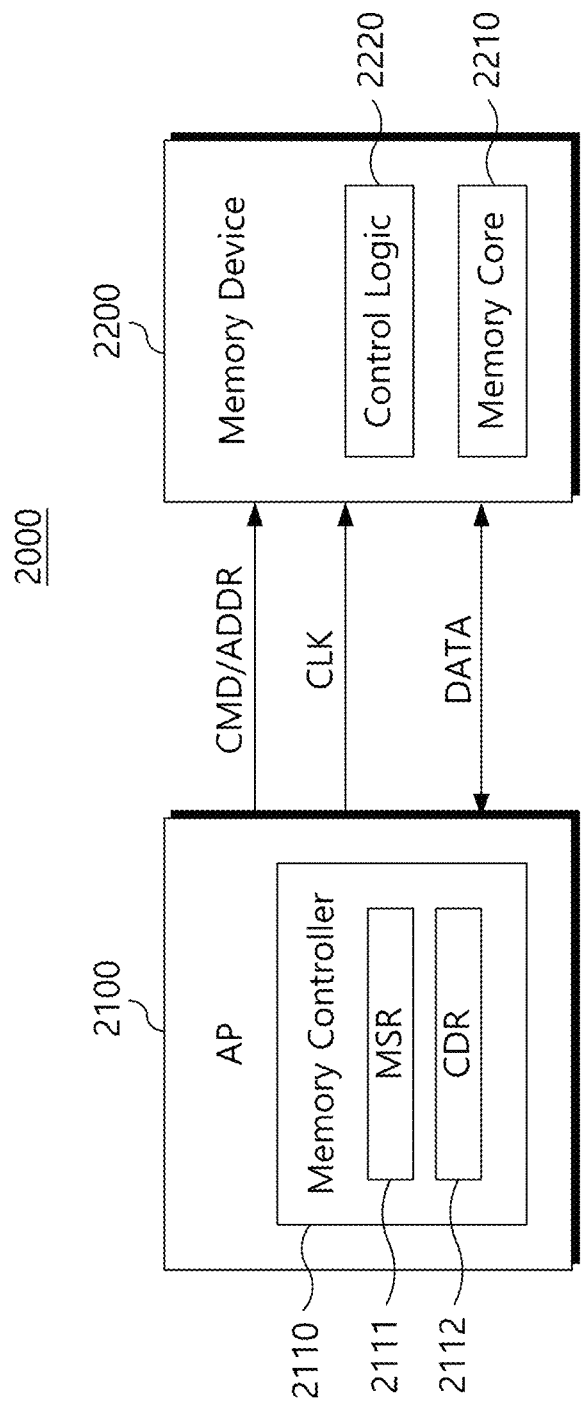
FIG. 12 is a diagram illustrating a mobile system, according to at least one example embodiment.

FIG. 12 is a diagram illustrating a mobile system according to at least one example embodiment. Referring to FIG. 12, a mobile system 2000 may include an application processor 2100 and/or a memory device 2200, but is not limited thereto, and for example, may include a greater or lesser number of constituent components. The application processor 2100 may include a memory controller 2110, a mode selection register 2111, and/or a crash dump register 2112, etc. For example, the mode selection register 2111 and the crash dump register 2112 may be included in the memory controller 2110, but is not limited thereto. As another example, the mode selection register 2111 and the crash dump register 2112 may be separated from the memory controller 2110, and separately provided in the application processor 2100. The memory device 2200 may include a control logic 2220 and/or a memory core 2210, etc.

According to at least one example embodiment, the memory controller 2100 may control the overall operation of the memory device 2200 by providing various signals to the memory device 2200. For example, the memory controller 2100 may control a memory access operation of the memory device 2200, such as a read operation and/or a write operation, etc. The memory controller 2100 may provide the command CMD and the address ADDR to the memory device 1200 to write data DATA into the memory device 2200 and/or to read data DATA from the memory device 1200. In addition, the memory controller 2100 may further provide a clock signal CLK to the memory device 2200.

According to at least one example embodiment, the memory device 2200 may output data DATA requested to be read by the memory controller 2100 to the memory controller 2100 and/or may store data DATA requested to be written by the memory controller 2100 in at least one memory cell of the memory device 2200. The memory device 2200 may input/output data DATA based on the command CMD, the address ADDR, and/or the clock signal CLK, etc. The memory device 2200 may include the memory core 2210 and/or the control logic 2220, etc. The memory core 2210 may include a memory cell array divided in units of banks. The memory cell array may include a plurality of memory banks, but is not limited thereto.

According to at least one example embodiment, the memory controller 2100 may perform the error recovery preparation method and/or the error recovery method of the memory device 2200 described with reference to FIGS. 4 to 11, but is not limited thereto. For example, upon booting of the mobile system 2000, the memory controller 2100 may verify a plurality of operation frequencies of the memory device 2200 through a training operation to determine whether the memory device 2200 operates properly and/or without error at each of the plurality of operation frequencies, etc. In the normal mode of the operating system, the memory controller 2110 may change operation frequencies of the memory device 2200 according to circumstances, current status, and/or current events of the mobile system 2000, etc. When at least one error in the memory device 2200 occurs while in at least one of the operation frequencies of the memory device 2200, the memory controller 2110 may verify memory controller setting information stored in the mode selection register 2111, etc. For example, the memory controller 2110 may calculate the memory reference code function based on memory controller setting information and may verify and/or determine the current operation frequency of the memory device 2200 through the memory reference code function, but is not limited thereto. The memory controller 2110 may store information regarding an operation frequency in which an error occurs in the crash dump register 2112 as an error frequency, but is not limited thereto. When an error continuously occurs in the memory device 2200 at the error frequency, the memory controller 2110 may reboot the operating system into a safe mode, etc.

According to at least one example embodiment, the memory controller 2110 may reboot the operating system into the safe mode based on the determined and/or verified error frequency. For example, before the operating system is rebooted into the safe mode, the memory controller 2110 may verify and/or determine the error frequency stored in the crash dump register 2112. The memory controller 2110 may drive the memory device 2200 by selecting, setting, and/or locking one of operation frequencies other than the verified error frequency (e.g., selecting and/or setting the operation frequency of the memory device 2200 to a different operation frequency than the verified error frequency and/or prohibiting the selection of the verified error frequency (e.g., locking out the verified error frequency), etc.). Accordingly, while in the safe mode of the operating system, the memory controller 2110 may stably drive the memory device 2200 at an operation frequency at which error-free operation is verified, inferred, and/or determined, etc. Accordingly, the memory controller 2110 may improve, diagnose, and/or solve a problem caused by an operation frequency error of the memory device 2200 and may improve and/or secure reliability. In the safe mode of the operating system, a user may improve, diagnose, and/or solve a problem of the mobile system 2000 by, for example, verifying various causes of a problem using a diagnostic tool and/or by deleting a recently installed program, etc. Also, in the safe mode of the operating system, a user may back up important files and/or perform other backup operations, etc.

According to at least one example embodiment of the inventive concepts, a safe mode of an operating system may be entered after and/or in response to driving (e.g., operating) the memory device through effective operation frequency except for the operation frequency in which an error occurs during a normal mode of the operating system.

The above descriptions are various example embodiments for carrying out the inventive concepts. Designs which may be changed and/or modified may be included in the example embodiments of the inventive concepts as well as at least one example embodiment described above. In addition, other technologies which are easily changed and implemented by using one or more of the example embodiments may be included in the inventive concepts. While the inventive concepts has been described with reference to various example embodiments thereof, it will be apparent to those of ordinary skill in the art that various changes and modifications may be made thereto without departing from the spirit and scope of the example embodiments of the inventive concepts as set forth in the following claims.

What is claimed is:

1. A method for preparing an error recovery operation of a memory device included in a memory system, the method comprising:

performing a training operation of the memory device upon power-on of the memory system;

booting an operating system into a normal mode by operating the memory device using a selected operation frequency of a plurality of operation frequencies based on results of the training operation;

detecting an error frequency among the plurality of operation frequencies in response to a change of the selected operation frequency of the memory device by the operating system, the error frequency being an operation frequency which causes at least one error in the memory device; and storing information regarding the detected error frequency in a first register included in a memory controller associated with the memory device.

2. The method of claim 1, wherein the detecting of the error frequency further includes:

operating the memory device at a selected operation frequency of the plurality of operation frequency; and determining the selected operation frequency is the error frequency in response to a failure to receive an expected response from the memory device associated with a transmitted memory command for the memory device for a specified time period.

3. The method of claim 2, wherein the detecting of the error frequency further includes:

determining memory controller setting information stored in a mode selection register; and obtaining the selected operation frequency of the memory device based on the memory controller setting information.

4. The method of claim 1, further comprising:

determining whether an expected response to a memory command has been received from the memory device within a first specified time period;

determining that the memory device is in an error state based on results of the determining whether the expected response has been received; and entering a rebooting sequence in response to the memory device being in the error state for greater than a second specified time period.

5. An error recovery method of a memory device included in a memory system, the method comprising:

verifying error frequency information stored in a first register included in a memory controller associated with the memory device during a booting sequence or a rebooting sequence of the memory system, the error frequency information including information regarding an operation frequency which causes at least one error in the memory device;

performing a training operation of the memory device based on the error frequency information;

setting a selected operation frequency among a plurality of operation frequencies of the memory device, the setting the selected operation frequency including prohibiting selection of the error frequency from the plurality of operation frequencies as the selected operation frequency; and booting or rebooting an operating system into a safe mode by operating the memory device at the selected operation frequency.

6. The method of claim 5, wherein the performing of the training operation further includes:

determining whether each of the operation frequencies of the plurality of operation frequencies is an error frequency, the error frequency causing at least one error in the memory device, and wherein the plurality of operation frequencies includes a first operation frequency of the memory device, a second operation frequency higher than the first operation frequency, a third operation frequency higher than the second operation frequency, and a fourth operation frequency higher than the third operation frequency.

7. The method of claim 6, wherein the setting of the selected operation frequency further includes:
in response to one of the second to fourth operation frequencies being the error frequency, setting the first operation frequency as the selected operation frequency.

8. The method of claim 6, wherein the setting of the selected operation frequency further includes:
in response to one of the second to fourth operation frequencies being the error frequency, setting an operation frequency of the plurality of operation frequencies lower than the error frequency as the selected operation frequency.

9. The method of claim 6, wherein the setting of the selected operation frequency further includes:
in response to the first operation frequency being the error frequency, setting one of the second to fourth operation frequencies as the selected operation frequency.

10. The method of claim 6, wherein the setting of the selected operation frequency further includes:
in response to the first operation frequency being the error frequency, setting an operation frequency of the plurality of operation frequencies higher than the first operation frequency as the selected operation frequency.

11. A memory system comprising:
a memory device configured to be operated based on a plurality of operation frequencies; and
a memory controller configured to,
detect an error frequency of the memory device among the plurality of operation frequencies while in a normal mode of an operating system, the error frequency being an operation frequency which causes at least one error in the memory device;
store information on the error frequency in a first register upon detection of the error frequency; and
operate the memory device by selecting an operation frequency from the plurality of operation frequencies other than the error frequency in response to the operating system being rebooted into a safe mode.

12. The memory system of claim 11, wherein the memory controller is further configured to:
determine whether an expected response from the memory device has been received within a specified time period in response to a transmitted memory command while the memory device is operated at the selected operation frequency; and
designate the selected operation frequency as the error frequency based on results of the determining.

13. The memory system of claim 11, wherein the memory controller is further configured to:

obtain a current operation frequency of the memory device in response to an error occurring in the operation of the memory device, and
designate the current operation frequency as the error frequency.

14. The memory system of claim 11, wherein the memory controller is configured to:
determine whether an expected response from the memory device has been received during a first specified time period following a transmitted command to the memory device while in a normal mode of an operating system;
determine that the memory device is in an error state based on results of the determining the expected response; and
execute the rebooting into the safe mode of the operating system in response to the error state exceeding a second specified time period.

15. The memory system of claim 11, wherein the memory controller is further configured to:
in response to the rebooting into the safe mode of the operating system, verify the error frequency information stored in the first register.

16. The memory system of claim 15, wherein the memory controller is further configured to:
in response to the rebooting into the safe mode of the operating system, identify whether the error frequency exists among a first operation frequency of the memory device, a second operation frequency higher than the first operation frequency, a third operation frequency higher than the second operation frequency, and a fourth operation frequency higher than the third operation frequency.

17. The memory system of claim 16, wherein the memory controller is further configured to:
in response to one of the second to fourth operation frequencies being the error frequency, select the first operation frequency as the selected operation frequency of the memory device.

18. The memory system of claim 16, wherein the memory controller is further configured to:
in response to one of the second to fourth operation frequencies being the error frequency, select an operation frequency lower than the error frequency as the selected operation frequency of the memory device.

19. The memory system of claim 16, wherein the memory controller is further configured to:
in response to the first operation frequency being the error frequency, select one of the second to fourth operation frequencies as the selected operation frequency of the memory device.

20. The memory system of claim 16, wherein the memory controller is further configured to:
in response to the first operation frequency being the error frequency, select an operation frequency higher than the first operation frequency as the selected operation frequency of the memory device.

* * * * *